(12) United States Patent
Furuta et al.

(10) Patent No.: US 8,184,252 B2
(45) Date of Patent: May 22, 2012

(54) IMAGE DISPLAY DEVICE

(75) Inventors: Futoshi Furuta, Kokubunji (JP); Hiroshi Kageyama, Hachioji (JP); Ken Takei, Kawasaki (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 465 days.

(21) Appl. No.: 12/509,602

(22) Filed: Jul. 27, 2009

(65) Prior Publication Data

US 2010/0026950 A1 Feb. 4, 2010

(30) Foreign Application Priority Data

Jul. 30, 2008 (JP) ................................ 2008-195637

(51) Int. Cl.
*G02F 1/1343* (2006.01)
*G02F 1/1345* (2006.01)
(52) U.S. Cl. ........................................ 349/139; 349/149
(58) Field of Classification Search .................. 349/139, 349/149
See application file for complete search history.

(56) References Cited

U.S. PATENT DOCUMENTS 6,727,875 B1 * 4/2004 Mikami et al. .................. 345/92
7,492,361 B2 2/2009 Kawachi et al.

FOREIGN PATENT DOCUMENTS

JP 2005-301219 10/2005

* cited by examiner

*Primary Examiner* — Dung T. Nguyen
(74) *Attorney, Agent, or Firm* — Antonelli, Terry, Stout & Kraus, LLP.

(57) ABSTRACT

An image display device includes a display panel having plural pixels and a second board having a transmitting electrode, the display panel having a first substrate that is disposed so as to overlap the second board, each pixel having a pixel electrode and a counter electrode, and the counter electrode being formed in a planar shape and being commonly provided to the pixel electrodes of each pixel; the counter electrode being divided into a portion A corresponding to the transmitting electrode of the second board and a portion B other than it, and the portions A and B of the counter electrode being connected to a common voltage through resistors. The portion A of the counter electrode constitutes the receiving electrode, and the portion A of the counter electrode acting as the receiving electrode is connected to a receiving circuit in the display panel through a decoupling capacitor.

19 Claims, 18 Drawing Sheets

PRIOR ART

IMAGE DISPLAY DEVICE

CLAIM OF PRIORITY

The patent application claims priority from Japanese patent application JP 2008-195637 filed on Jul. 30, 2008, the content of which is hereby incorporated by reference into this application.

BACKGROUND OF THE INVENTION

1. Field of the Invention

The present invention relates to an image display device, and more specifically, to a technology that is effective when display data is transmitted/received through a wireless transmission path.

2. Description of the Related Art

In an active matrix display device which is typified by the liquid crystal display device, a thin film transistor (hereinafter referred to as a TFT) composed of an active element is formed for each pixel, and a video is displayed by making each pixel storing display information.

On the other hand, a TFT formed using a poly-silicon film that is polycrystallized by processing laser anneal on an amorphous silicon film so that the mobility is raised to about 100 $cm^2/V \cdot s$ as a semiconductor layer is called a poly-silicon TFT.

Since a circuit constructed with this poly-silicon TFT operates with a signal of a few MHz to a few tens of MHz at maximum, a data driver circuit for generating a video signal and a scanning circuit for performing scan as well as the pixels can be formed on a board of a liquid crystal display device etc. by the same process as that of the TFT constituting the pixel.

Further, as a communication system of transmitting/receiving a signal (e.g., display data, a display control signal, etc.) through the wireless transmission path, there can be considered a systems that use electrostatic induction (capacitive coupling), electromagnetic induction, and an electromagnetic wave. Incidentally, the electrostatic induction (the capacitive coupling) is disclosed by, for example, the following JP-A-2005-301219.

Generally the liquid crystal display panel consists of plural pixels arranged in a matrix (also called sub-pixels) and a drive circuit for inputting a drive voltage into the pixels. Here, an area where the plural pixels are arranged in a matrix is called a display area, and an area other than it where the drive circuit, etc. are arranged is generally called a frame part.

FIG. 19 shows a configuration of the pixels of an active matrix liquid crystal display panel. Each of the pixels arranged in a matrix consists of a thin film transistor (TFT) constituting an active element, a pixel electrode (PX), a counter electrode (CT), and a liquid crystal sandwiched between the pixel electrode (PX) and the counter electrode (CT).

By supplying a selection scanning voltage to a gate line (GL), turning on the thin film transistor (TFT) one display line by one display line, and supplying an image voltage sequentially to a driver line (DL) in accordance with it, it is possible to send an arbitrary image voltage to the pixel electrode (PX) of the each pixel. The counter electrode (CT) is one piece of a tabular electrode opposed commonly to all the pixels, and is connected to a common voltage (Vcom). The drive circuit has an interface function with external devices, a function of outputting the display data to the driver line (DL), and a function of driving the gate line (GL) in the liquid crystal display panel.

In the design of the liquid crystal display panel, importance is attached to reducing the frame part that does not participate in display.

On the other hand, although a method using an electromagnetic wave or electromagnetic induction as a communication system of transmitting/receiving the signal through the wireless transmission path is suited to longer-distance communications, the display signal must be modulated and demodulated using a carrier wave of a higher frequency; therefore, the signal needs to be modulated at a far higher frequency than a transmission rate of the signal. This constraint incurs electric power increase by high-speed circuit driving and increase of the area by formation of circuit elements.

On the other hand, although the capacitive coupling as shown in FIG. 5 of the above-mentioned JP-A-2005-301219 is limited for shorter distance transmission, it can be constructed only with electrodes for transmission because it does not need modulation and demodulation. Since circuits of modulation and demodulation are unnecessary, it has an advantage that the electrodes can be constructed with only a small occupied area.

However, in order to construct the coupling electrostatic capacitance for transmitting a data signal and an electric power signal, transmitting and receiving electrodes having a certain degree of area is needed. As one example of the area, it needs to be about 2 mm×2 mm for the data signal and about 2 mm×50 mm for the electric power signal.

With the conventional technology, these receiving electrodes must be arranged in the frame part outside the display area in a receiving-side liquid crystal display panel.

The reason is, firstly, because it is difficult to newly construct the receiving electrode in the each pixel. This is because the each pixel has already the pixel electrode (PX) in it, and a manufacture process of the display panel become complicated in order to dispose the receiving electrode that overlaps it.

Secondly, even when the receiving electrode is successfully arranged, since the counter electrodes (CT's) exist, parasitic capacitance is generated between itself and the receiving electrode. Originally, the thickness of the liquid crystal is several microns and is very much thin as compared with 0.5- to 1-mm gap that is assumed for a distance between the transmitting and receiving electrodes. Therefore, there is a problem that parasitic capacitance far larger than the electrostatic capacitance which can be constructed between the transmitting and receiving electrodes arises and it is impossible to transmit the data signal and the electric power signal efficiently.

Due to this fact, with the conventional technology, the receiving electrode must be arranged in an outer peripheral part of the display area, which causes a problem that a frame area increases further by the amount of the electrodes in the display panel.

SUMMARY OF THE INVENTION

The present invention was made to solve the problems of the conventional technology, and an object of the present invention is to provide a technology of making it possible to suppress the increase of the frame to a minimum in an image display device that adopts a communication system of transmitting/receiving a signal by means of capacitive coupling and has plural pixels arranged in matrix.

The above-mentioned and other objects and new features of the present invention will be clarified by description of this specification document and the accompanying drawings.

Outline of the representative characteristics among those of the invention disclosed in this patent application will be described briefly, which are as shown below.

According to an embodiment of the present invention, in an image display device that includes a display panel having plural pixels and a the second board having transmitting electrodes, the display panel having a first board that is disposed so as to overlap the second board, the each pixel having a pixel electrode and a counter electrode, and the counter electrode being formed in a tabular shape and being opposed commonly to the pixel electrode of the each pixel; the counter electrode is divided into a portion A corresponding to the transmitting electrode on the second board and a portion B other than it, and the portion A and the portion B of the counter electrode are connected to a common voltage through resistors.

Moreover, in the present invention, the transmitting electrode of the second board consists of one pair of transmitting electrodes for electric power, plural transmitting electrodes for signals, and a transmitting electrode for a reference voltage that is arranged between the one pair of transmitting electrodes for electric power and the plural transmitting electrodes for signals.

In the present invention, the portion B of the counter electrode is divided into plural areas along an equipotential line produced in a case where a certain electric charge is given in the portion A, and each of the plural areas is connected to the common voltage through the resistor.

Moreover, in the present invention, the portion A of the counter electrode constitutes a receiving electrode, and the portion A of the counter electrode is connected to a receiving circuit in the display panel through a decoupling capacitor.

In the present invention, the group of pixel electrodes being opposed to the transmitting electrodes of the second board constitute the receiving electrode, and the group of pixel electrodes are connected to the receiving circuit in the display panel through the decoupling capacitors.

In the present invention, the group of adjacent pixel electrodes being opposed to the transmitting electrodes of the second board constitute the receiving electrode, and the group of the pixel electrodes are connected to the receiving circuit in the display panel through diodes.

In the present invention, the display panel is a liquid crystal display panel that has a liquid crystal sandwiched between the first board and a third board being opposed to the first board, and the counter electrode is formed on the third board.

Alternatively, in the present invention, the display panel is a liquid crystal display panel that has a liquid crystal panel sandwiched between the first board and the third board being opposed to the first board, and the counter electrode is formed on the first board.

Alternatively, in the present invention, the display panel is an organic EL (Electroluminescence) display panel.

Effects that are obtainable by representative aspects among those of the invention disclosed in this application will be explained briefly, which are as shown below.

According to an embodiment of the present invention, in the image display device that adopts the communication system of transmitting/receiving the signal by means of the capacitive coupling and has the planar electrode, it becomes possible to suppress the increase of the frame to a minimum.

DETAILED DESCRIPTION OF THE INVENTION

Figure 1:
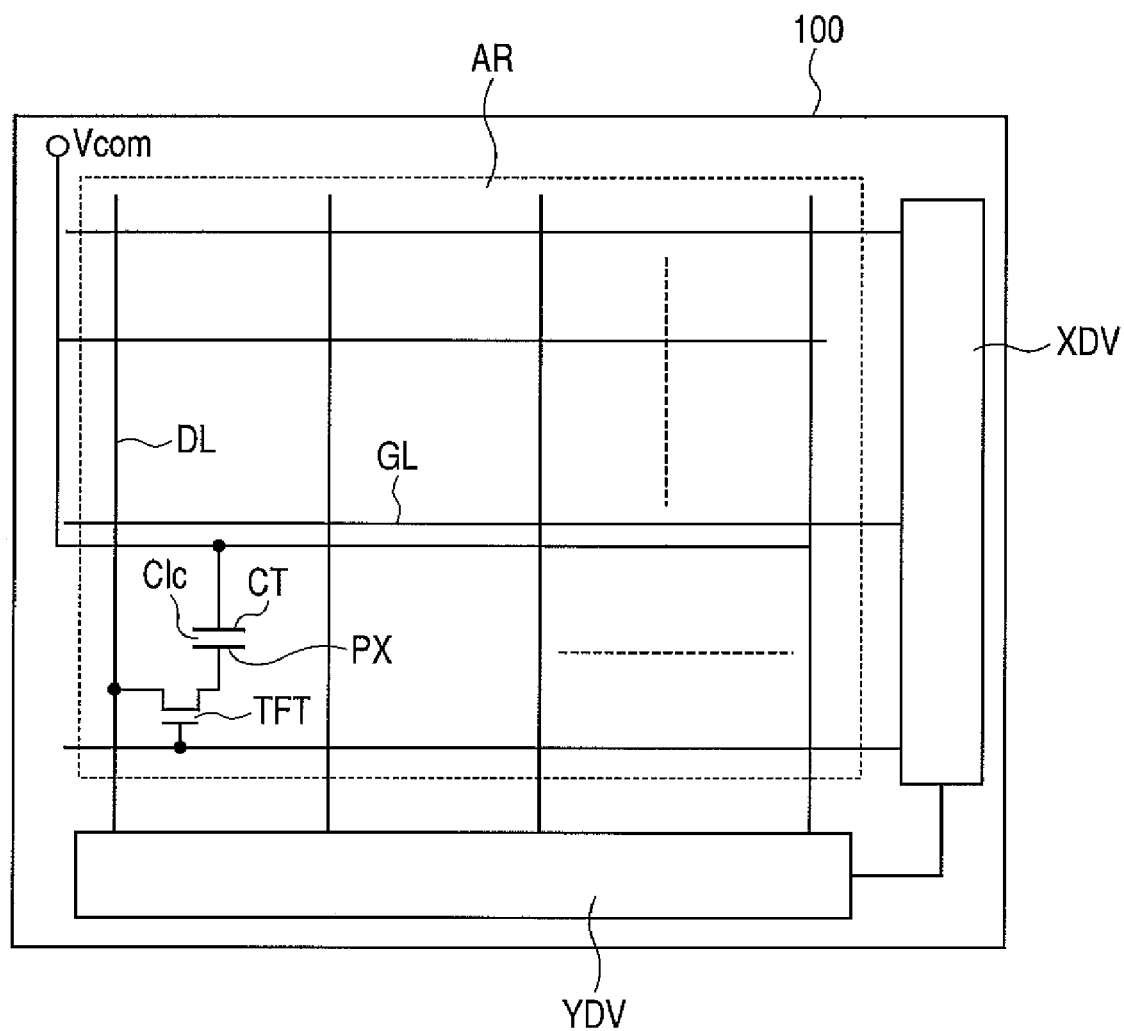
FIG. 1 is a circuit diagram showing an equivalent circuit of a liquid crystal display panel of a liquid crystal display device that is an embodiment of the present invention.

Hereafter, embodiments of the present invention will be described in detail with reference to drawings.

Incidentally, in all the drawings referred to for explaining the embodiments, what has the same function is designated by the same reference numeral and its repeated explanation is omitted.

FIG. 1 is a circuit diagram showing an equivalent circuit of a liquid crystal display panel of a liquid crystal display device of the present invention.

In FIG. 1, a reference numeral 100 is a panel board (also called a TFT board, or an active matrix board), and AR is a display area. In the display area (AR), pixels are formed in a matrix. The each pixel has a pixel electrode (PX) and a thin film transistor (TFT) for impressing a video signal to the pixel electrode (PX). This thin film transistor (TFT) is made up of a poly-silicon TFT. That is, the thin film transistor (TFT) uses a poly-silicon film that is polycrystallized by processing laser anneal on an amorphous silicon film so that the mobility is raised to about 100 $cm^2/V \cdot s$ as a semiconductor layer.

The gate electrodes of the thin film transistors (TFT's) in a row direction are connected to a gate line (GL), and this gate line (GL) is connected to a scanning circuit (XDV).

The drain electrodes of the thin film transistors (TFT's) in the column direction are connected to a driver line (DL), and this driver line (DL) is connected to a data driver circuit (YDV).

The source electrode of the thin film transistor (TFT) is connected to the pixel electrode (PX). Here, since a liquid crystal (LC) is sandwiched between the pixel electrode (PX) and a counter electrode (CT), a liquid crystal capacitance (Clc) is formed equivalently between the pixel electrode (PX) and the counter electrode (CT). Incidentally, a way as to which is designated by the source electrode and the drain electrode may be reverse depending on how to bias the electrode. In this specification, an electrode that is connected to the driver line (DL) is designated by the drain electrode.

Transistors inside the scanning circuit (XDV) and the data driver circuit (YDV) are also made up of the poly-silicon TFT's. In addition, the poly-silicon transistors inside the scanning circuit (XDV) and the data driver circuit (YDV) are formed by the same process as that of the thin film transistors (TFT's) in the display area (AR) simultaneously.

The scanning circuit (XDV) supplies a selection voltage (scanning signal) of a "High" level to each sequential scanning signal line (GL) for every 1 horizontal scanning time based on a reference clock that is generated inside. By this supply, the plural thin film transistors (TFT's) connected to the each scanning signal line (GL) of the liquid crystal display panel is made to establish electrical conduction between the driver line (DL) and the pixel electrodes (PX's) during one horizontal scanning period.

Moreover, the data driver circuit (YDV) outputs an image voltage corresponding to a gradation that the pixel should display (so-called gradation voltage) to the driver line (DL). When the thin film transistor (TFT) is in ON state (conduction), the image voltage is supplied to the pixel electrode (PX) from the driver line (DL).

After that, the thin film transistor (TFT) turns into OFF state, whereby the image voltage based on an image that the pixel should display is held in the pixel electrode (PX).

A common voltage (Vcom) is impressed to the counter electrode (CT). The liquid crystal display panel displays the image by changing an orientation direction of liquid crystal molecules (LC) sandwiched between the pixel electrode (PX) and the counter electrode (CT) by means of a potential difference between the two electrodes and by altering the transmittance or reflectance of light.

The liquid crystal display panel of this embodiment is constructed by: superimposing a panel board 100 on which the pixel electrode (PX), the this film transistor (TFT), etc. are provided and an opposed board (not illustrated) on which color filters etc. are formed to each other being separated with a predetermined gap; cementing the both boards together with a sealing material that is provided in the vicinity of peripheral parts of the both boards in the form of a frame; enclosing a liquid crystal between the both boards from an inlet of liquid crystal provided in a part of the sealing material and sealing it; and attaching polarizing plates on the outsides of the both boards.

Thus, the liquid crystal display device module of this embodiment has a configuration such that the liquid crystal is sandwiched between one pair of the boards.

What is necessary regarding materials of the panel board 100 and the opposed board is just to be an insulating board, and therefore it is not limited to glasses but may be plastics etc. Since this embodiment is the liquid crystal display panel of a vertical electric field system, such as a TN (Twisted Nematic) system and a VA (Vertical Alignment) system, the counter electrode (CT) is provided on an opposed board 110.

Note that since the present invention does not have a direct connection with an internal structure of the liquid crystal display panel, a detailed explanation of the internal structure of the liquid crystal display panel is omitted. Furthermore, the present invention is applicable to a liquid crystal display panel of whatever structure.

[Outline of the Present Invention]

In the case where the receiving electrode for transmitting/receiving the signal by means of capacitive coupling is provided in the liquid crystal display panel, its interfere with the existing pixel cannot be avoided in providing the electrode in whatever way.

Figure 2A:
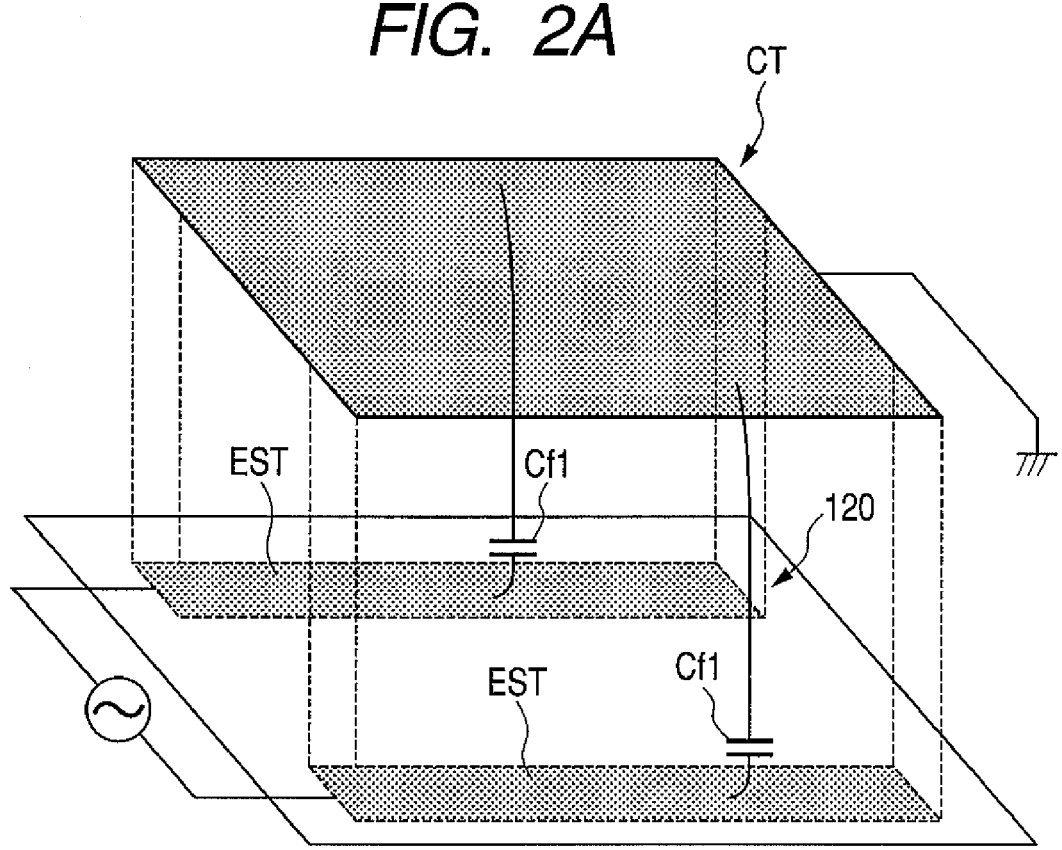
FIG. 2A and FIG. 2B are diagrams explaining transmission/reception of a signal by means of capacitive coupling in the conventional liquid crystal display device.
Figure 2B:
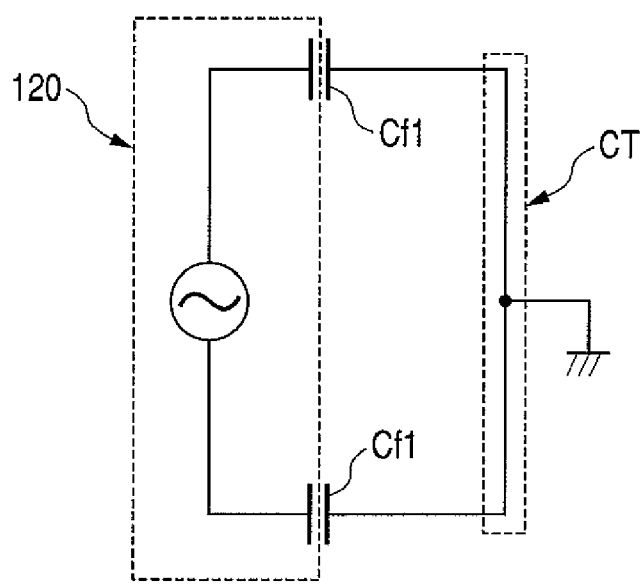

FIGS. 2A and 2B are diagrams explaining transmission/reception of the signal by the capacitive coupling in the conventional liquid crystal display device, wherein FIG. 2A is a diagram showing an arrangement relation of the transmitting and receiving electrodes, and FIG. 2B is a circuit diagram showing an equivalent circuit.

Figure 3A:
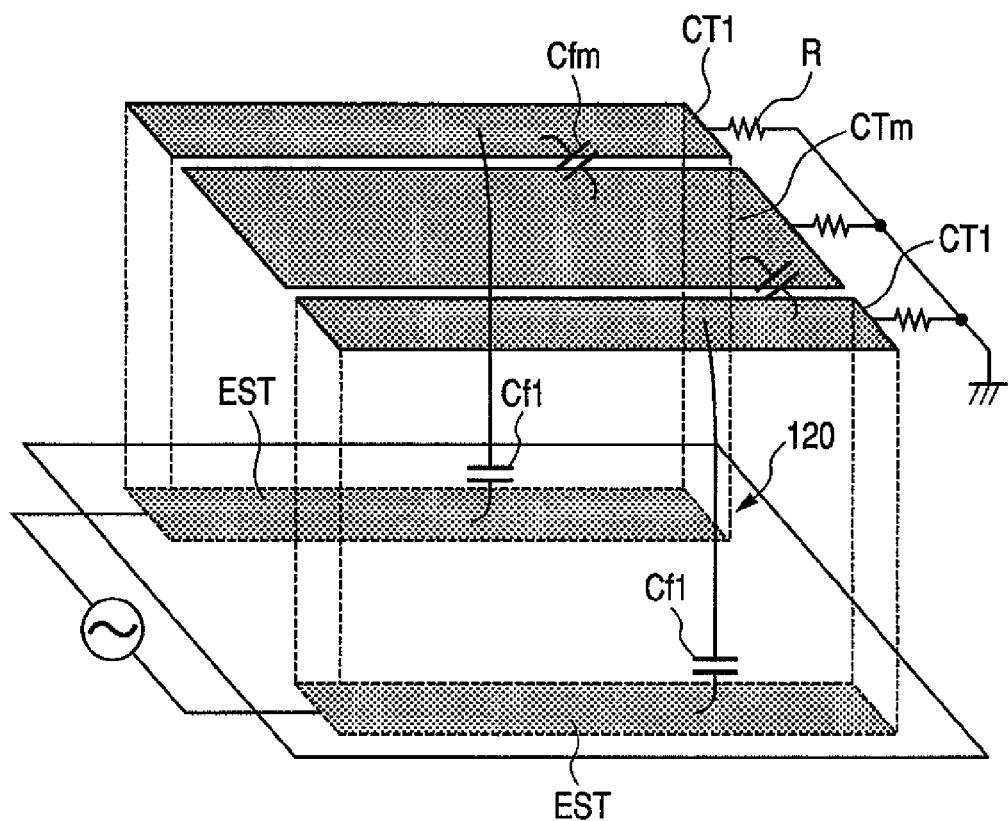
FIG. 3A and FIG. 3B are diagrams explaining transmission/reception of the signal by means of the capacitive coupling in the liquid crystal display device of the present invention.
Figure 3B:
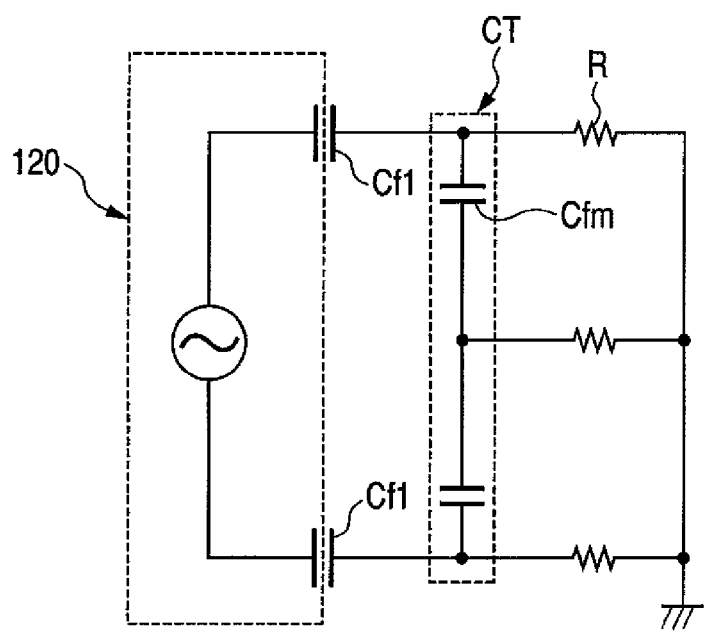

FIGS. 3A and 3B are diagrams explaining the transmission/reception of the signal by means of the capacitive coupling in the liquid crystal display device of the present invention, wherein FIG. 3A is a diagram showing the arrangement relation of the transmitting and receiving electrodes, and FIG. 3B is a circuit diagram showing an equivalent circuit.

Figure 4A:
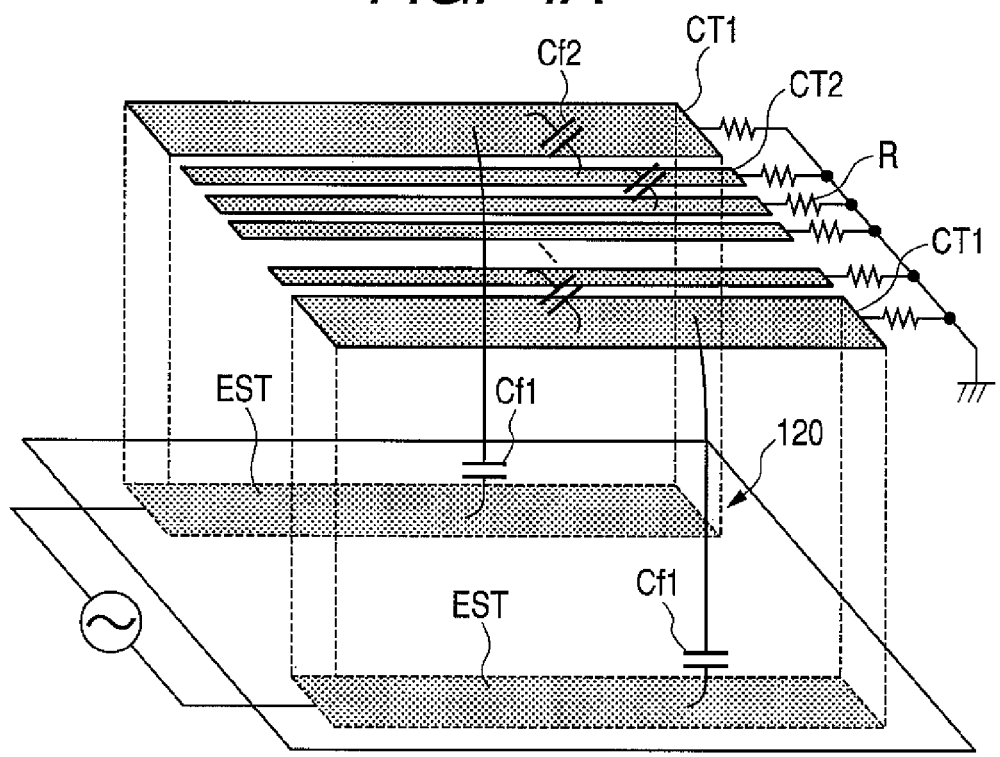
FIG. 4A and FIG. 4B are diagrams explaining transmission/reception of the signal by means of the capacitive coupling of a modification of the liquid crystal display device of the present invention.
Figure 4B:
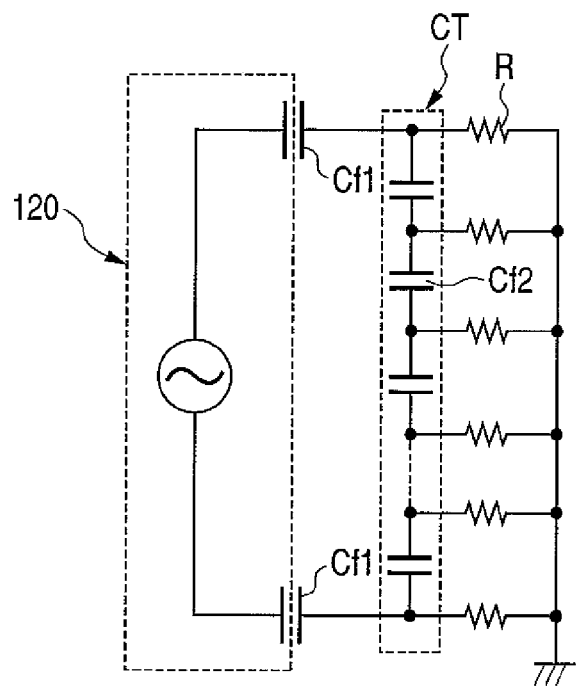

FIGS. 4A and 4B are diagrams explaining transmission/reception of the signal by means of the capacitive coupling according to a modification of the liquid crystal display device of the present invention, wherein FIG. 4A is a diagram showing the arrangement relation of the transmitting and receiving electrodes, and FIG. 4B is a diagram showing an equivalent circuit.

As shown in FIG. 2A, generally, the counter electrode (CT) being opposed to the pixel electrode (PX) is one electrode that covers the whole surface of all the pixels, which is connected to the common voltage (Vcom). If plural transmitting electrodes (EST's) on a transmitting board 120 are made to oppose to it, almost all portions of the electric field (electric flux lines) concentrates on the counter electrode (CT), and a stray capacitance (Cf1) is produced between the transmitting electrodes and the counter electrode. Due to this fact, as shown in FIG. 2B, a short circuit state is established through the stray capacitance (Cf1) between the transmitting electrodes on the transmitting board 120, and the signal intended to be transmitted is absorbed.

Against this problem, as shown in FIG. 3A, the counter electrode (CT) is divided into an area (CT1) being opposed to the transmitting electrodes (EST's) on the transmitting board 120 and an area (CTm) other than that area in advance. By this division, as shown in FIG. 3B, a new stray capacitance (Cfm) arises on the counter electrode side, making a form that it is inserted in a signal route formed between the transmitting electrodes. Furthermore, this stray capacitance (Cfm) becomes smaller than the case where the counter electrode before the division and the transmitting electrode are made to oppose to each other.

For this reason, an influence of the short-circuit type stray capacitance (Cf1) formed by the transmitting electrode (EST) and the counter electrode (CT) can be reduced. The divided counter electrodes (CT1, CTm) are connected to the common voltage (Vcom) through resistors (R's).

The resistance of the resistor (R) is set so that a product of it and an electrostatic capacitance consisting of the divided counter electrodes (CT1, CTm) and the corresponding pixel electrodes (PX's) may be sufficiently smaller than a response time of the liquid crystal. By this configuration, it is possible to avoid the influence on the pixel caused by insertion of the resistor (R).

Further, by dividing the remaining area (CTm) of the counter electrode into plural areas (CT2's) as shown in FIG. 4A, it becomes possible to insert a stray capacitance (Cf2) produced by the division into the signal route, and consequently the influence of the short-circuit type stray capacitance formed by the transmitting electrode (EST) and the counter electrode (CT) can be reduced. If a direction of the division is made to run along an equipotential line that is produced assuming a case where an electric charge is put on the coupling electrode (if it is invariant, an adequate value may be passable), the area can be divided efficiently.

First Embodiment

Figure 5A:
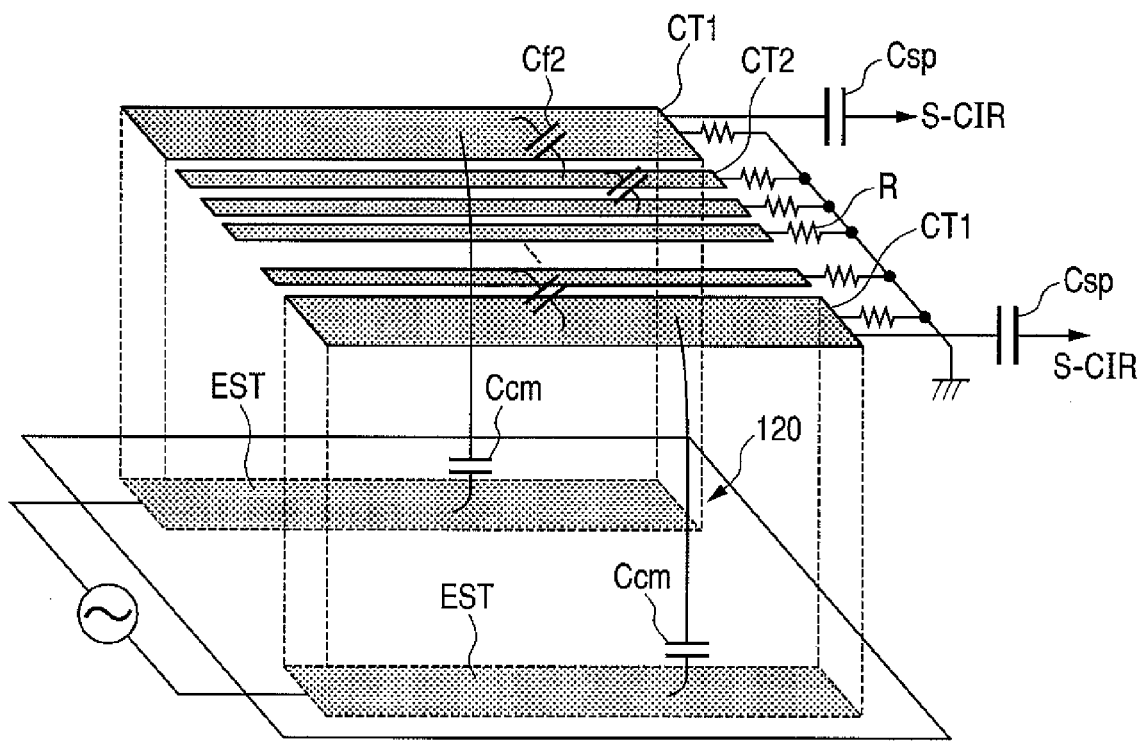
FIG. 5A and FIG. 5B are diagrams explaining transmission/reception of the signal by means of the capacitive coupling in a liquid crystal display device of a first embodiment of the present invention.
Figure 5B:
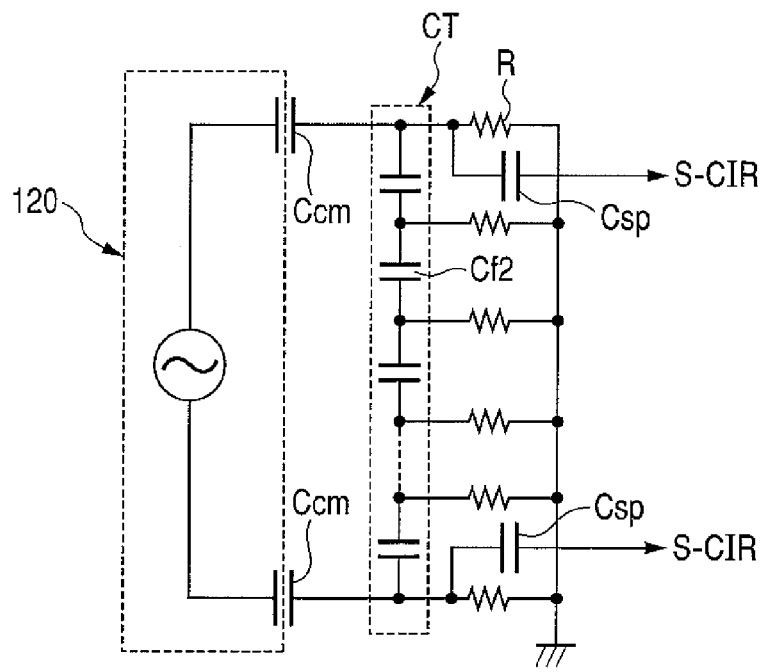

FIGS. 5A and 5B are diagrams explaining transmission/reception of the signal by means of the capacitive coupling in the liquid crystal display device of a first embodiment of the present invention, wherein FIG. 5A is a diagram showing the arrangement relation of the transmitting and receiving electrodes, and FIG. 5B is a circuit diagram showing an equivalent circuit.

In this embodiment, as shown in FIG. 5A, the counter electrodes (CT1's) that are opposed to the transmitting electrodes (EST's) and were divided are used, as they are, as the receiving electrode. In this case, the stray capacitance (Cf1) produced between the transmitting electrode (EST) and the counter electrode (CT1) acting as the receiving electrode becomes a coupling capacitor (Ccm) for transmitting the signal to the liquid crystal display panel from the transmitting board 120.

Since the signal is inputted into a receiving circuit (S-CIR) in the liquid crystal display panel from the receiving electrode through another electrostatic capacitance (a decoupling capacitor; Csp), it does not interfere in an operation of the each pixel.

By appropriately selecting the electrostatic capacitance value of this decoupling capacitor (Csp), it is possible to transmit the signal transmitted by means of the capacitive coupling to the receiving circuit (S-CIR) in the liquid crystal display panel, completely without affecting the signal of the pixel.

Figure 6A:
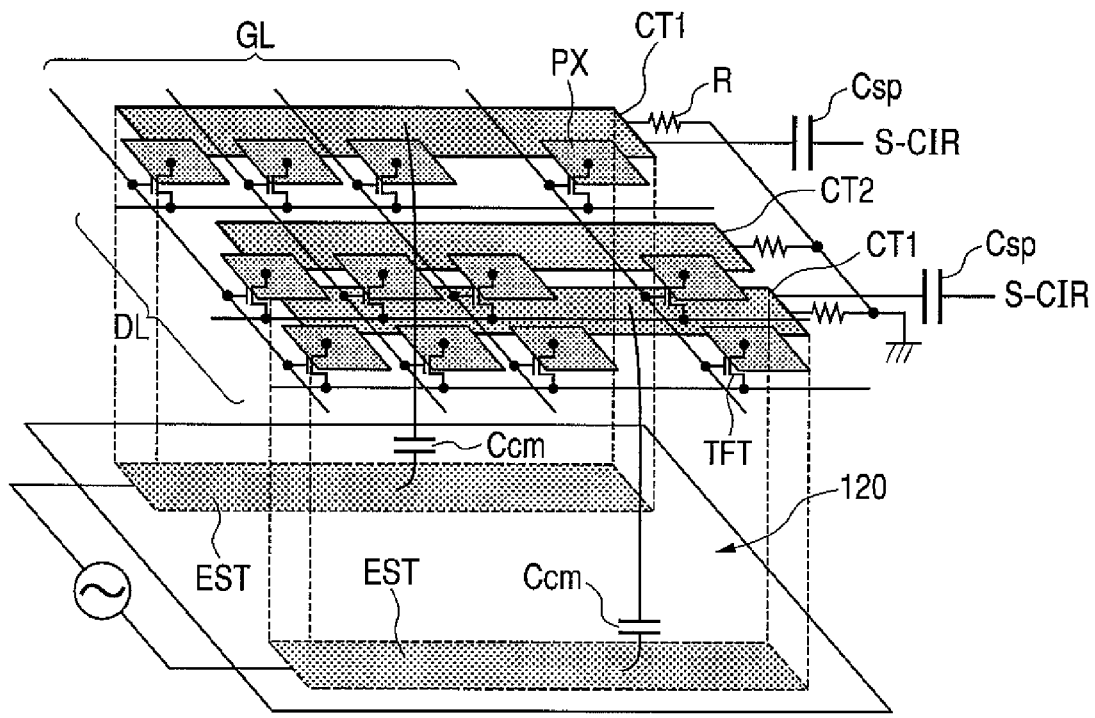
FIG. 6A and FIG. 6B are diagrams showing an outline configuration of a liquid crystal display device panel of the first embodiment of the present invention.
Figure 6B:
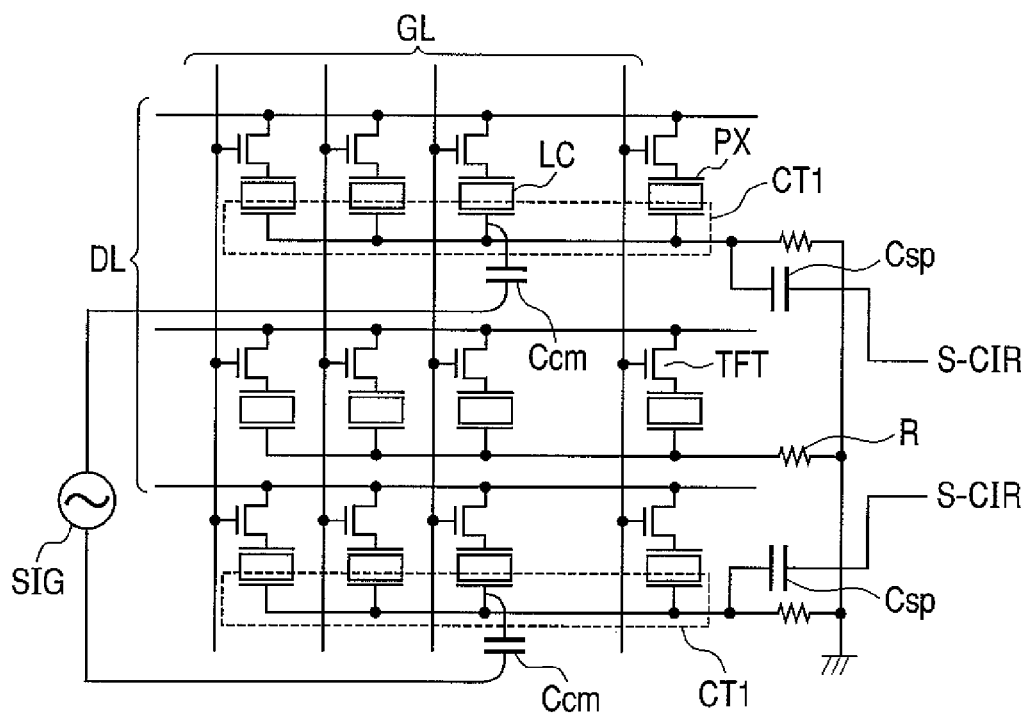

FIGS. 6A and 6B are diagrams showing an outline configuration of the liquid crystal display panel of the first embodiment of the present invention, wherein FIG. 6A is a diagram showing the arrangement relation of the transmitting and receiving electrodes, and FIG. 6B is a circuit diagram showing an equivalent circuit.

In this embodiment, a case where the signal of one signal source (SIG) is transmitted with two pairs of the transmitting and receiving electrodes is assumed. The transmitting electrodes (EST's) and the divided counter electrodes (CT1's) of the liquid crystal display panel being opposed to the transmitting electrodes (EST's) constitute the coupling capacitor (Ccm).

The signal transmitted/received through the coupling capacitor (Ccm) is inputted into the receiving circuit (S-CIR) in the liquid crystal display panel from the divided counter electrodes (CT1's) that constitute the receiving electrode through the decoupling capacitors (Csp's).

Although the plural pixel electrodes (PX's) exist between the transmitting electrodes (EST's) and the divided counter electrodes (CT1's), they do not become causes of new stray capacitances because these pixel electrodes (PX's) are electrically separated by the thin film transistors (TFT's) each other. Moreover, although an electric field corresponding to the transmitted signal is impressed to the pixel electrode similarly as to the counter electrode (CT1), it will not cause an influence to a display operation by setting a frequency of the transmitted signal to not less than a few MHz, sufficiently higher than a response speed of the liquid crystal.

A capacitance value of the decoupling capacitor (Csp) is set so as to be larger the coupling capacitor (Ccm), and impedance at a frequency of the image voltage (hereinafter referred to as a frequency of a pixel signal) is set so as to be higher than an impedance of the thin film transistor (TFT).

The former condition is to allow the transmitted signal to be inputted into the receiving circuit (S-CIR) without being attenuated, and the latter condition is not to allow the pixel signal to be inputted into the receiving circuit (S-CIR).

The resistance of the resistor (R) connected between the divided counter electrode (CT1) and the common voltage (Vcom) is set so that a time constant that is a product of the electrostatic capacitance (pixel capacitor) consisting of the counter electrode and all the pixel electrodes (PX's) being opposed to the counter electrode concerned and the resistor (R) may become sufficiently smaller than the display holding interval of the each pixel of the liquid crystal display panel and so that the resistance may become higher than impedance of the decoupling capacitor (Csp) at the frequency of the transmitted signal.

The former condition is to prevent that updating of what is displayed within a predetermined time becomes impossible, because if the resistance of the resistor (R) becomes too high a resistance, it will take too much time for a voltage impressed over the liquid crystal to be charged and discharged. The latter condition is to prevent that the transmitted signal leaks to the common voltage (Vcom) through the resistor (R).

Figure 7:
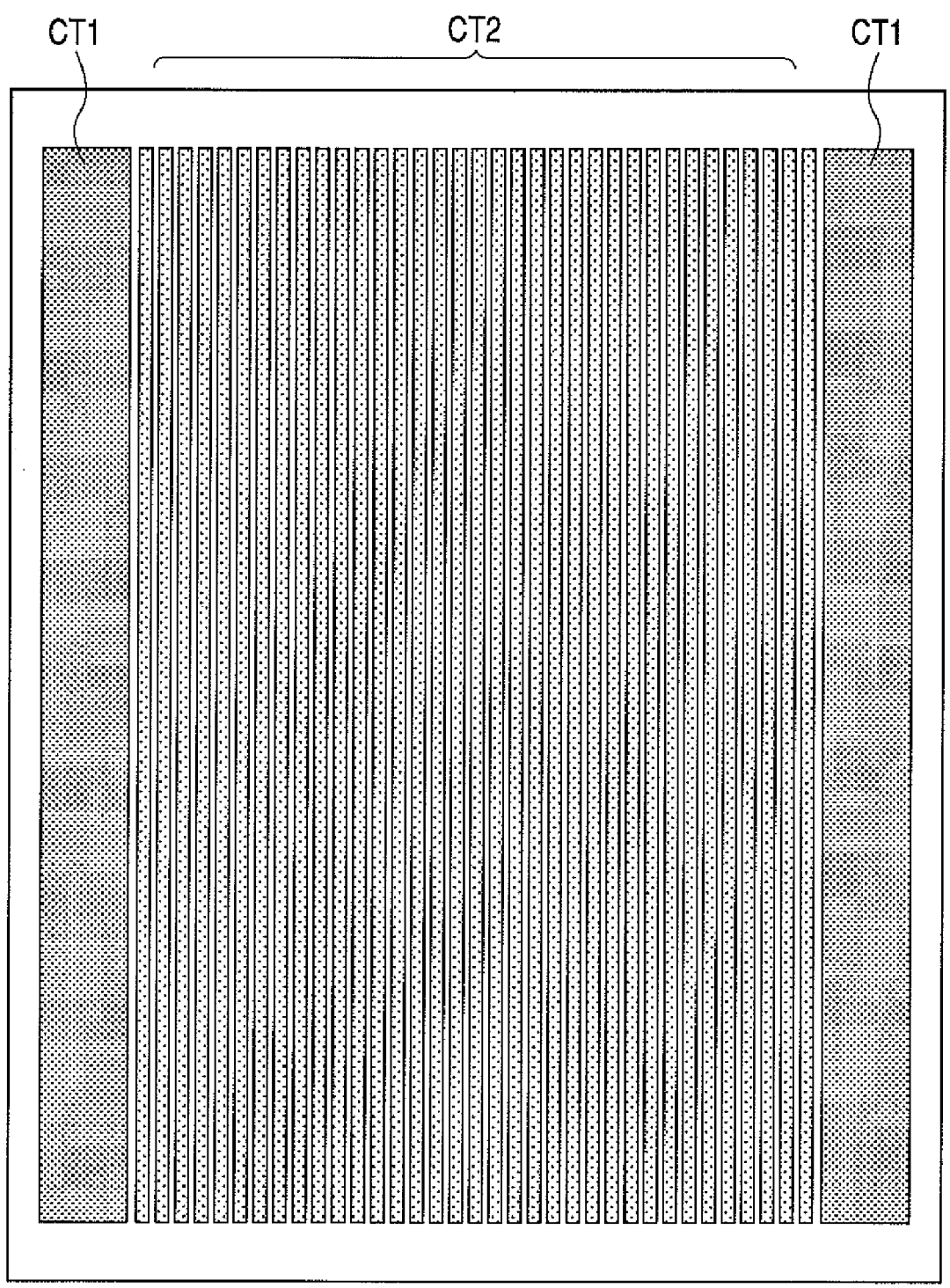
FIG. 7 is a diagram showing a situation of division of a counter electrode of the first embodiment of the present invention.

FIG. 7 is a diagram showing a situation of division of the counter electrode of this embodiment.

Along an equipotential line produced in a case where a positive electric charge is put on either of the two divided counter electrodes (CT1's) that constitute the receiving electrode and a negative electric charge is put on the remaining electrode, the portion other than the two divided counter electrodes (CT1's) that constitute the receiving electrode is divided into plural counter electrodes (CT2's).

In this embodiment, using an approximation that the electric field produced by positive and negative electric charges being put on the two divided counter electrodes (CT1's) arranged in parallel is uniform, the portion other than the two divided counter electrodes (CT1's) that constitute the receiving electrode is divided vertically along the two divided counter electrodes (CT1's). Since the two divided counter electrodes (CT1's) must be completely opposed to the pixel electrodes (PX's) of the respective pixels, the boundary of division needs to be brought into agreement with the pixel array.

Figure 8:
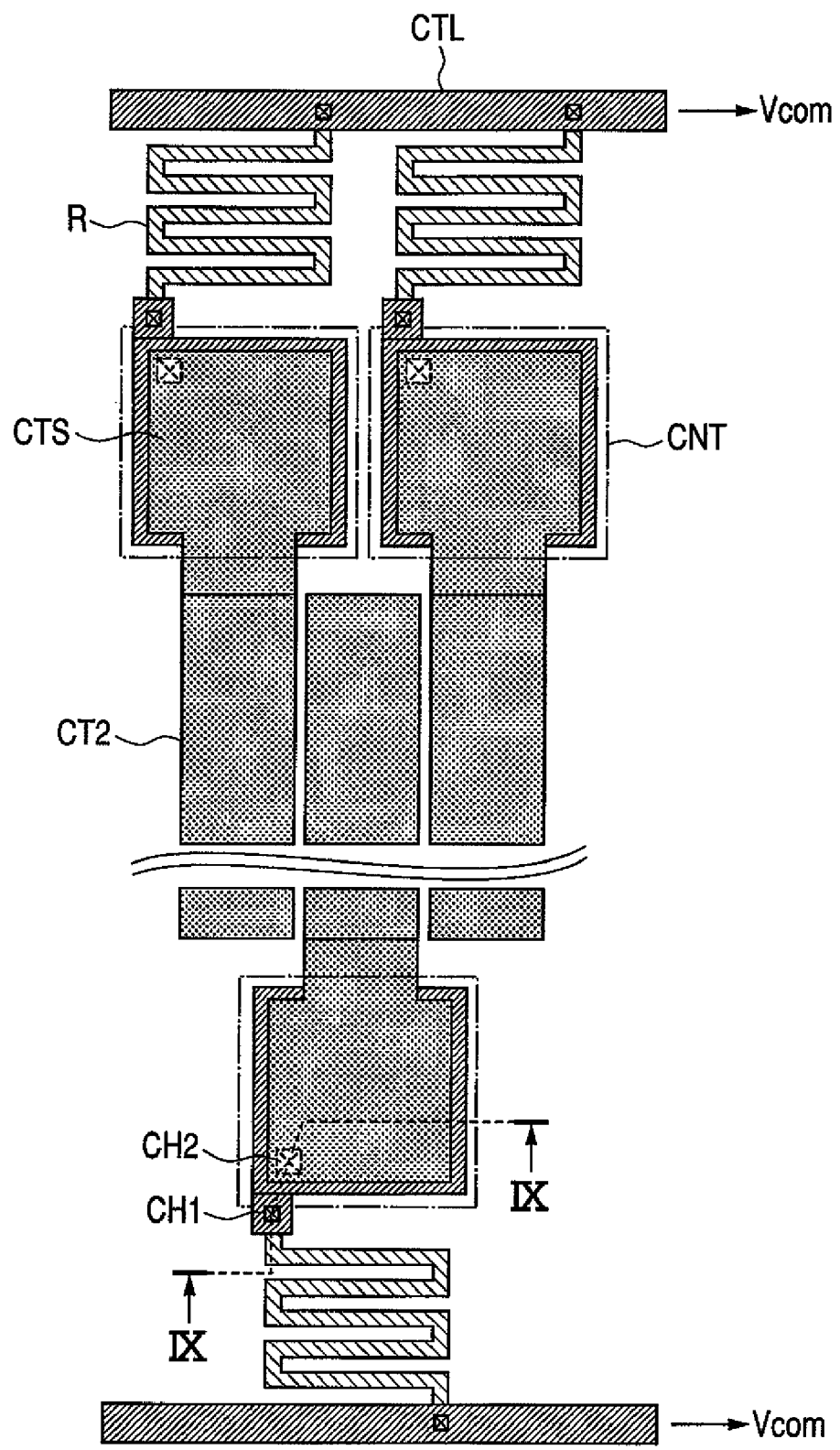
FIG. 8 is a diagram showing a layout of a counter electrode of the liquid crystal display panel of a first embodiment of the present invention and a connection part connecting with the panel board.

FIG. 8 is a diagram showing a layout of the counter electrode (CT2) of the liquid crystal display panel of this embodiment and a connection part of the panel board 100.

The divided counter electrodes (CT2's) are formed on an opposed board 110. The divided counter electrodes (CT2's) are connected to the common voltage (Vcom) through the resistors (R's), respectively. In practice, the end of the counter electrode (CT2) is connected to the common voltage (Vcom) through a connection electrode (CTS) of the panel board 110, electric conductive beads (BZ) and the resistors.

FIG. 8 shows an example where the connection parts of CNT are arranged on an edge of one of the divided counter electrodes (CT2's) and an edge of the other thereof alternately. The alternate arrangement of the connection parts of CNT prevents that the connection parts concentrate at a specific side.

The each divided counter electrode (CT2) is connected to a counter electrode line (CTL) from which the common voltage (Vcom) is supplied from the connection part (CNT) through the resistor (R) integrated on the panel board 100.

Figure 9:
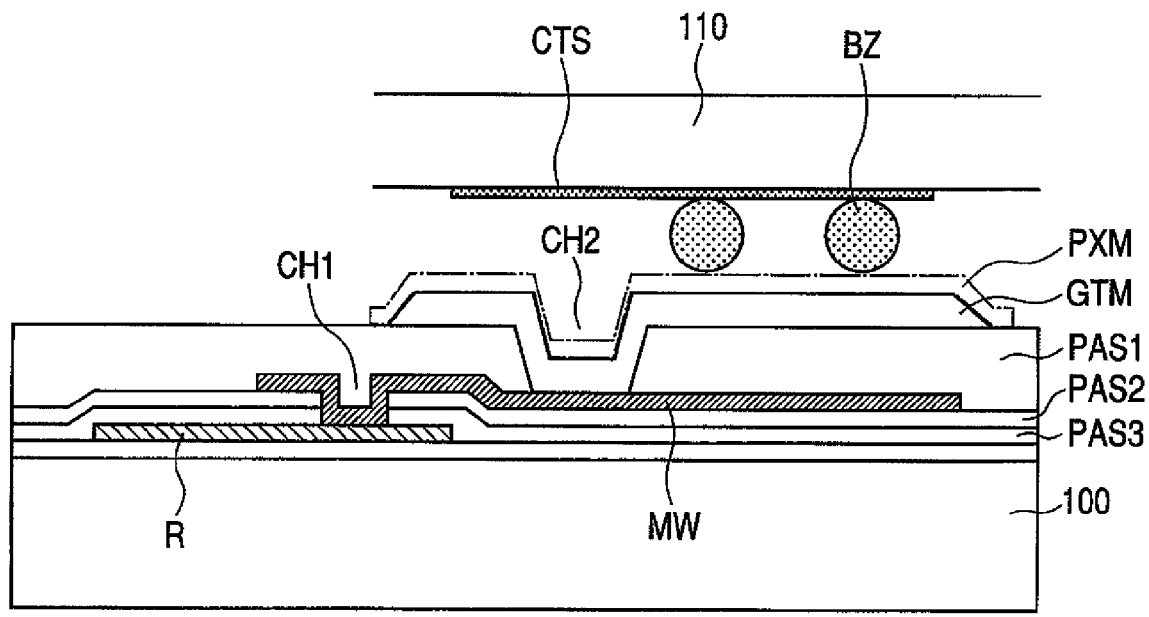
FIG. 9 is a sectional view showing a configuration of the connection part along a cutting line IX-IX shown in FIG. 8.

FIG. 9 is a sectional view showing a configuration of the connection part along a cutting line IX-IX shown in FIG. 8.

On the panel board 100, the resistor (R) is formed by a poly-silicon layer, and a metal wiring layer (MW) is connected to this resistor (R) through a contact hole (CH1) formed in inter-layer insulators (PAS2, PAS3).

Moreover, a gate metal layer (GTM) is connected to the metal wiring layer (MW) through a contact hole (CH2) formed in an inter-layer insulator (PAS1). A pixel electrode layer (PXM) is formed on this gate metal layer (GTM).

Further, the connection electrode (CTS) on the connection part (CTN) to which the end of the divided counter electrode (CT2) on the opposed board 110 is connected, is connected to the pixel electrode layer (PXM) on the panel board 100 through the conductive beads (BZ).

Figure 10:
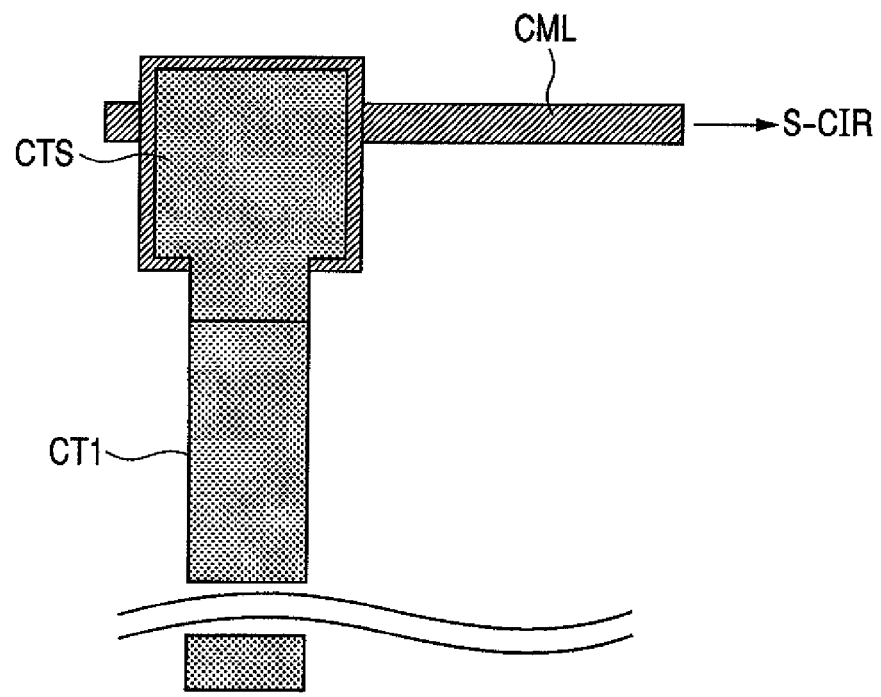
FIG. 10 is a diagram showing a layout example of a decoupling capacitor shown in FIGS. 6A and 6B.

FIG. 10 is a layout view showing a configuration of the connection part that shows one example of a layout of the decoupling capacitor (Csp) shown in FIG. 6.

Figure 11:
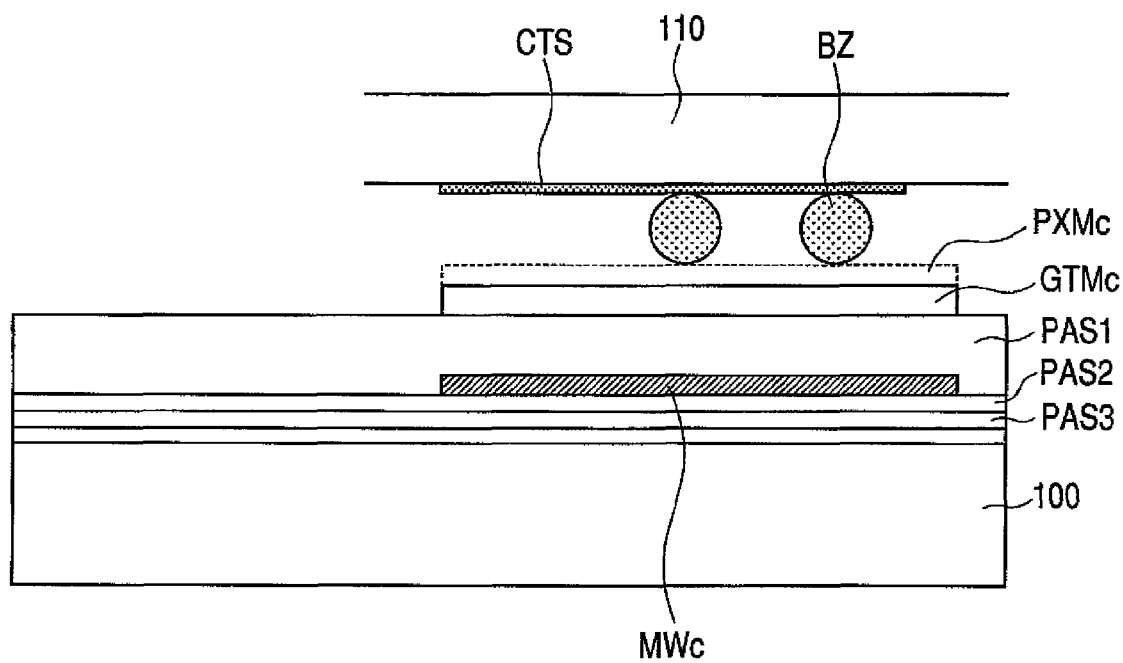
FIG. 11 is a sectional view showing a configuration of the decoupling capacitor shown in FIG. 10.

FIG. 11 is a sectional view showing a configuration of the decoupling capacitor (Csp) shown in FIG. 10.

The connection electrode (CTS) on the connection part (CTN) to which one end of the divided counter electrode (CT1) is connected, is connected to the counter electrode line (CTL) to which the common voltage (Vcom) is supplied through the resistor (R), and on the other hand, it is connected to a metal wiring layer (CML) through the decoupling capacitor (Csp). This metal wiring layer (CML) is connected to the receiving circuit (S-CIR) in the liquid crystal display panel.

In the layout example shown in FIG. 10 and FIG. 11, a metal wiring layer (MWc) acting as one electrode of the decoupling capacitor (Csp), a gate metal layer (GTMc) acting as the other electrode thereof, and the pixel electrode layer (PXM) are formed on the panel board 100.

This metal wiring layer (MWc) and the pixel electrode layer (PXM) (or the gate metal layer (GTMc)) are opposed to each other through the inter-layer insulator (PAS1). Further, the metal wiring layer (MWc) is connected to the metal wiring layer (CML), and the connection part to which the ends of the divided counter electrodes (CT1's) are connected is connected to a pixel electrode layer (PXMc) on the panel board 100 through the conductive beads (BZ).

By this configuration, it is possible to transmit the signal transmitted through the coupling capacitor (Ccm) to the receiving circuit (S-CIR) in the liquid crystal display panel.

Second Embodiment

Figure 12:
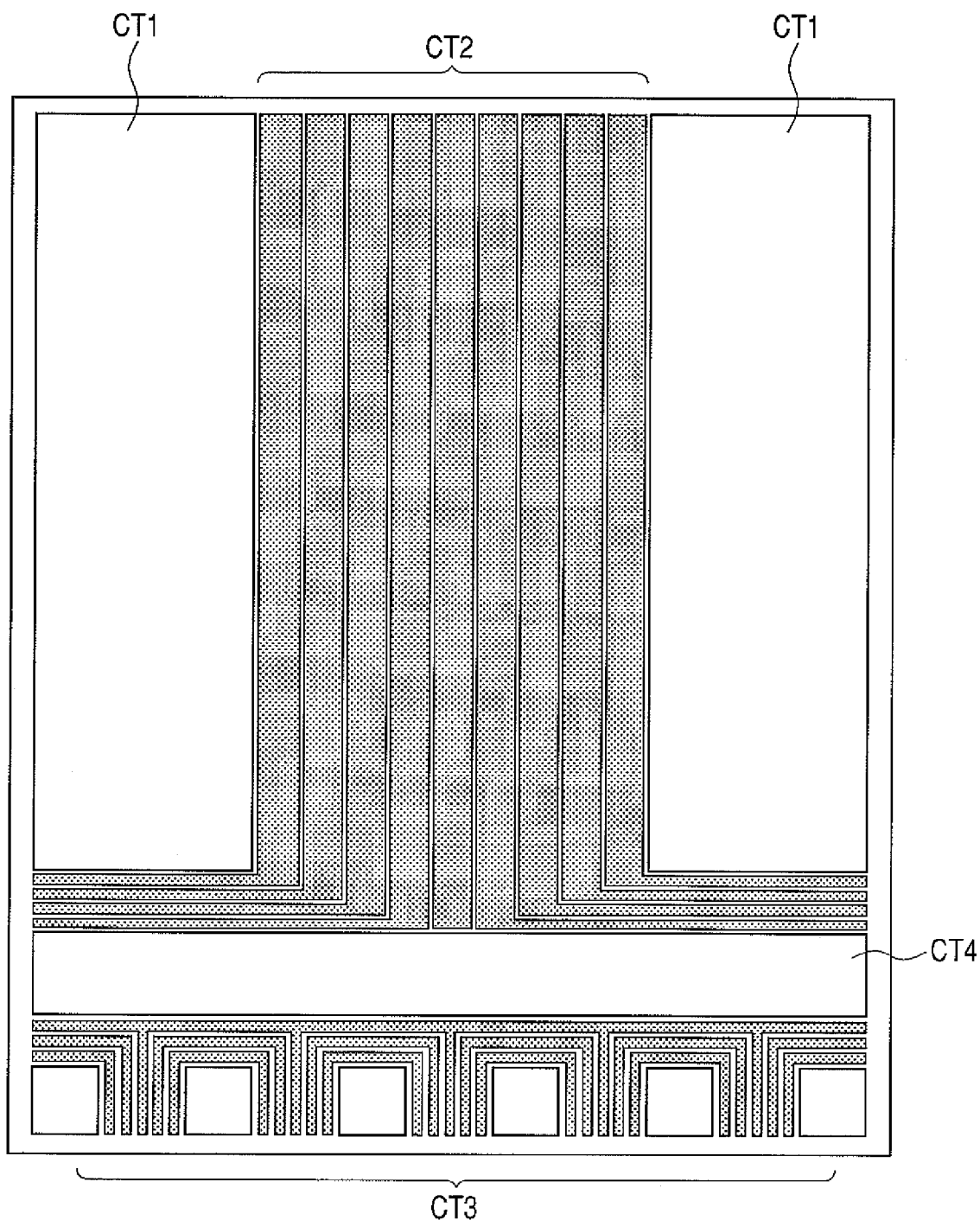
FIG. 12 shows an example of division of the counter electrode of a liquid crystal display panel of a second embodiment of the present invention.

FIG. 12 shows an example of division of the counter electrode of the liquid crystal display panel of this second embodiment. Similarly with the first embodiment, this embodiment uses the divided counter electrodes (CT1's) as the receiving electrode, and it is assumed in this embodiment that the two counter electrodes (CT1's) constituting the receiving electrode for electric power signals, six counter electrodes (CT3's) constituting the receiving electrode for data signals, and one counter electrode (CT4) constituting the receiving electrode for ground electric potential are arranged in display area.

A method for dividing the counter electrode (CT) in this case is as follows.

First, when a positive electric charge is put on either of the two counter electrodes (CT1's) for electric power, a negative electric charge is pit on the remaining one electrode, a positive electric charge and a negative electric charge are alternately put on the counter electrodes (CT3's) for data signals, and a voltage of the counter electrode for ground electric potential is set to zero, along the equipotential line that is arisen, the remaining counter electrode area is divided to provide the counter electrodes (CT2's).

In a complicated electrode arrangement of this embodiment, the equipotential line is found by solving a Laplace equation and a Poisson equation. When these equations are solved, the equipotential line will be curves in many examples. However, since the divided counter electrodes (CT1 to CT4) need to be completely opposed to the respective pixel electrodes (PX's), the division shall be done so that its direction may agree with the pixel array. Therefore, an actual dividing direction becomes two directions of horizontal and perpendicular ones, as shown in FIG. 12.

Third Embodiment

Figure 13A:
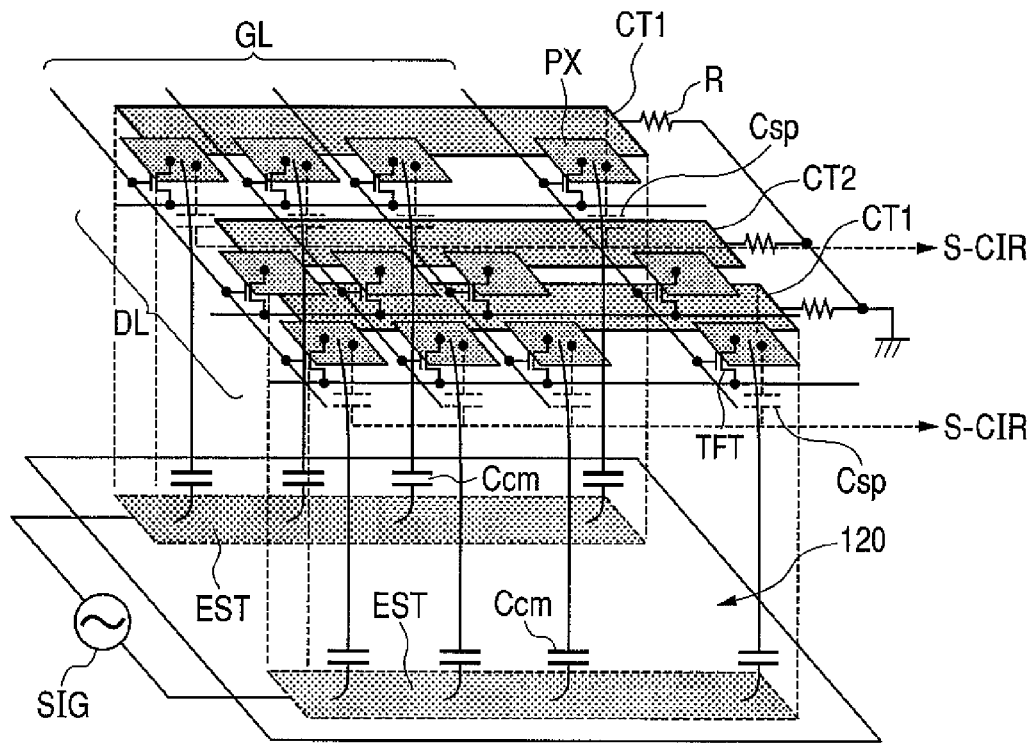
FIG. 13A and FIG. 13B are diagrams showing an outline configuration of a liquid crystal display panel of a third embodiment of the present invention.
Figure 13B:
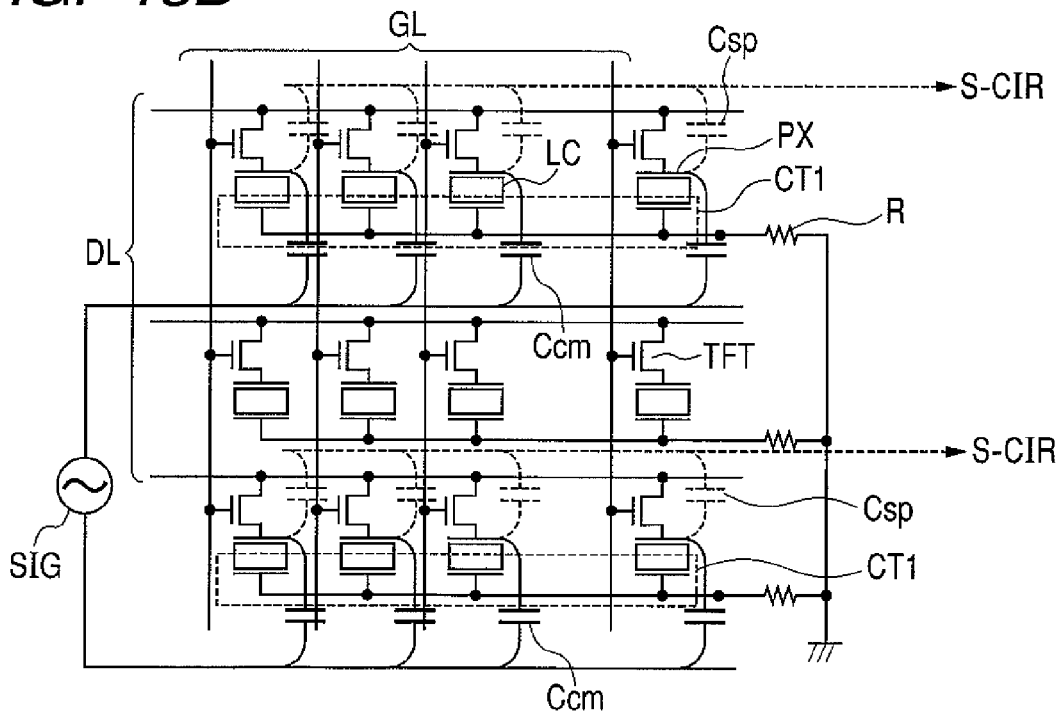

FIGS. 13A and 13B are diagrams showing an outline configuration of the liquid crystal display panel of a third embodiment of the present invention, wherein FIG. 13A is a diagram showing the arrangement relation of the transmitting and receiving electrodes, and FIG. 13B is a circuit diagram showing an equivalent circuit.

In this embodiment, the pixel electrode (PX) is used as the receiving electrode. Therefore, in this embodiment, the pixel electrodes (PX's) of the pixels that are opposed to the transmitting electrodes (EST's) function as a group of receiving electrodes. In this embodiment, the case where the signal of the one signal source (SIG) is transmitted by two pairs of groups of transmitting and receiving electrodes is assumed.

The signals transmitted from the respective pixel electrodes (PX's) of the group of pixel electrodes that constitute the receiving electrode are brought into one through the decoupling capacitors (Csp's), and this one signal is inputted into the receiving circuit (S-CIR) in the liquid crystal panel.

Although the counter electrode (CT1) exists being opposed to the each pixel electrode (PX), this does not become a cause of the stray capacitance because this electrode is physically divided by the same method as that of the first embodiment. Although the electric field corresponding to the transmitted signal is impressed also to both the pixel electrode (PX) and the counter electrode (CT1), this impression will not affect the display operation by setting the frequency of the transmitted signal to not less than a few MHz, sufficiently higher than the response speed of the liquid crystal (LC).

The capacitance value of the decoupling capacitor (Csp) is set so that a total value of the entire group of pixel electrodes may be larger than the coupling capacitor (Ccm) and an impedance at the frequency of the pixel signal may become higher than the impedance of the thin film transistor (TFT). The former condition makes it possible for the transmitted signal that is transmitted to be inputted into the receiving circuit (S-CIR) in the liquid crystal display panel, without being attenuated; the latter condition makes it possible for the pixel signal not to be inputted into the receiving circuit (S-CIR) in the liquid crystal display panel.

The resistance of the resistor (R) connected between the divided counter electrodes (CT1, CT2) and the common voltage is set so that a time constant that is a product of the resistance and an electrostatic capacitance (pixel capacitor) consisting of the divided counter electrodes and the whole pixel electrodes being opposed to the counter electrodes concerned may become sufficiently smaller than a display holding interval for the each pixel of the liquid display panel, and so that the resistance may become higher than the impedance of the decoupling capacitor (Csp) at the frequency of the transmitted signal.

Since if the resistance of the resistor (R) becomes too high a resistance, it takes much time for the voltage impressed over the liquid crystal (LC) to be charged and discharged, the former condition is to prevent that display updating within s predetermined time becomes impossible. The latter condition is to prevent that the transmitted signal leaks to the common voltage (Vcom) through the resistor (R). This is because the signal happens to be transmitted to the counter electrode (CT1) behind, although it is assumed that the signal is received by the pixel electrode (PX) in this embodiment.

Figure 14:
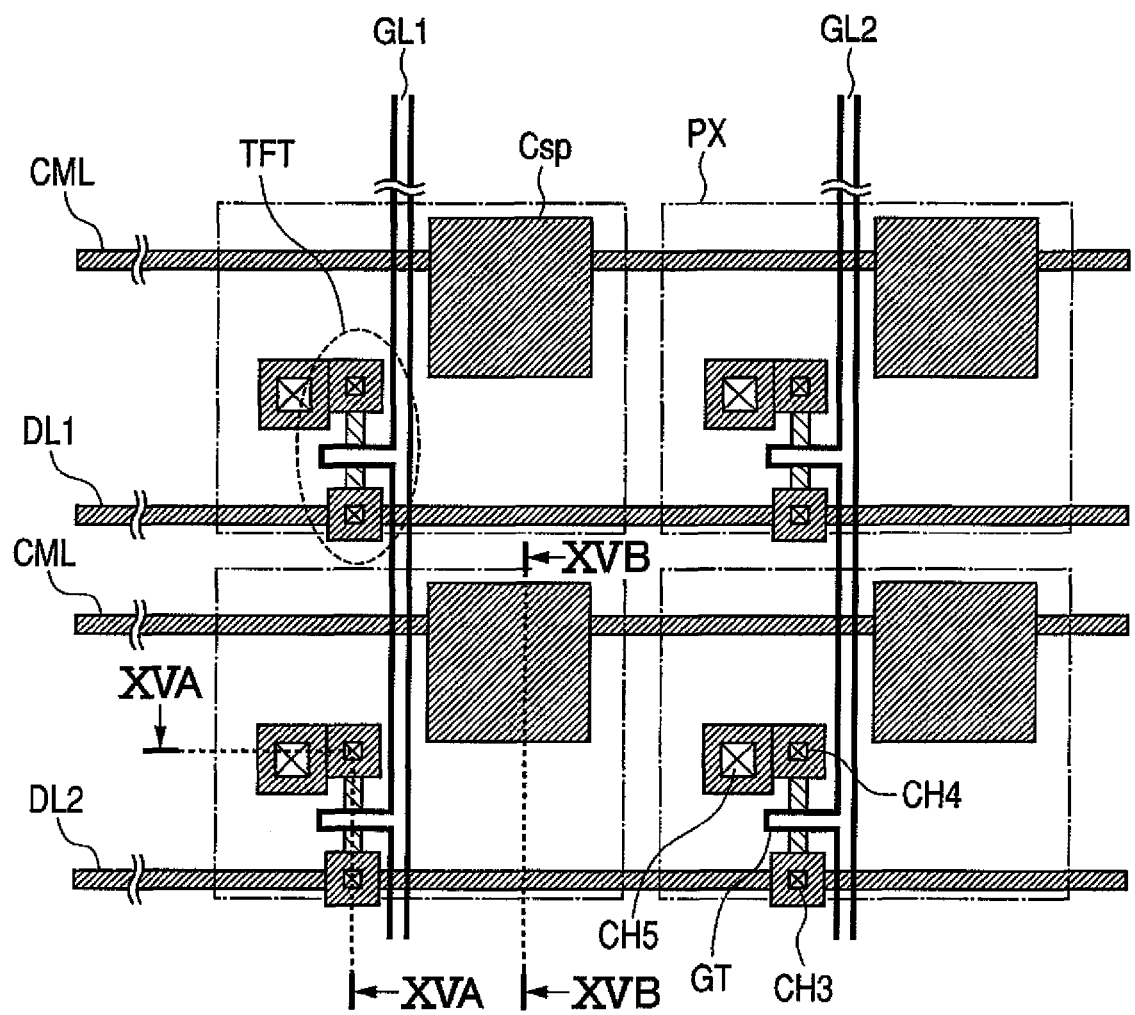
FIG. 14 shows a layout example of each pixel in the case where the pixel electrode is used as a receiving electrode in the third embodiment of the present invention.

FIG. 14 shows a layout example of the pixels in the case where the pixel electrodes (PX's) are used as the receiving electrode. FIG. 14 shows a layout of the pixel electrode (PX), the thin film transistor (TFT), and the decoupling capacitor (Csp). Since the reflective liquid crystal display panel is assumed in this embodiment, the pixel electrode (PX) is made up of a material that does not transmit the light, but reflects it. Then, the thin film transistors (TFT's) and the decoupling capacitors (Csp's) are integrated under the pixel electrodes (PX's).

Figure 15A:
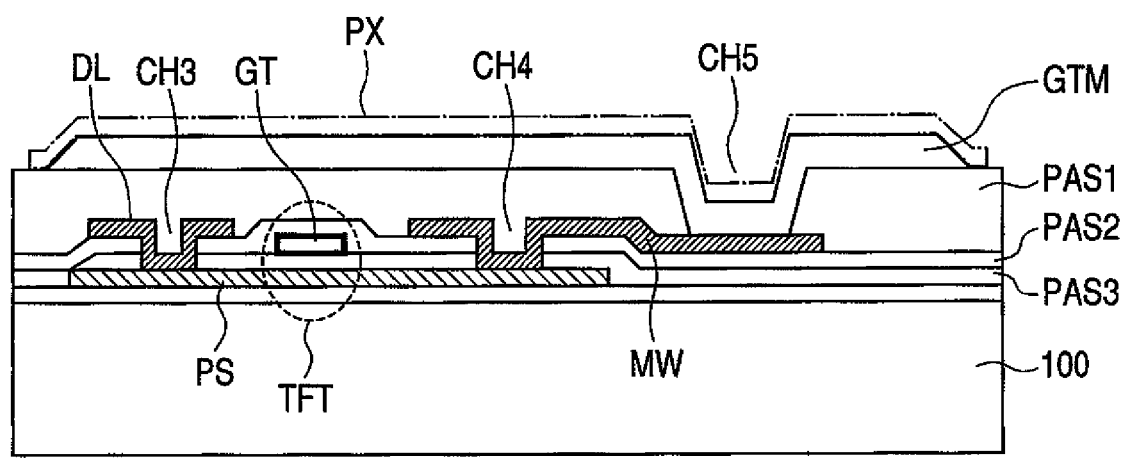
FIG. 15A and FIG. 15B are sectional views showing cross-sectional structures along a cutting line XVA-XVA of FIG. 14 and along a cutting line XVB-XVB of FIG. 14, respectively.
Figure 15B:
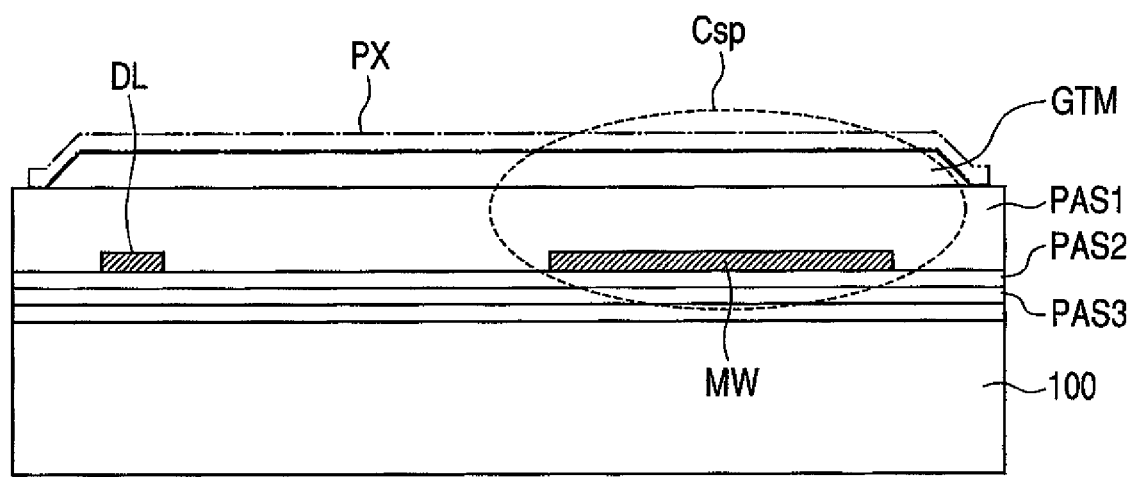

FIGS. 15A and 15B are sectional views showing cross-sectional structures along a cutting line XVA-XVA of FIG. 14 and along a cutting line XVB-XVB of FIG. 14.

FIG. 15A is a sectional view showing a cross-sectional structure along the cutting line XVA-XVA of FIG. 14, showing a view in which the thin film transistor (TFT) is integrated under the pixel electrode (PX) in the case of the cutting line XVA-XVA. FIG. 15B is a sectional view showing a cross-sectional structure along the cutting line XVB-XVB of FIG. 14, showing a view in which the decoupling capacitor (Csp) is integrated under the pixel electrode (PX) in the case of the cutting line XVB-XVB.

As shown in FIGS. 15A and 15B, the driver line (DL) formed on the panel board 100 is connected to a semiconductor layer (PS) that is made up of a poly-silicon layer through a contact hole (CH3) formed in the inter-layer insulators (PAS2, PAS3).

The semiconductor layer (PS) is connected to the metal wiring layer (CML) through a contact hole (CH4) formed in the inter-layer insulators (PAS2, PAS3), and the metal wiring layer (MW) is connected to the gate metal layer (GTM) through a contact hole (CH5) formed in the inter-layer insulator (PAS1). The pixel electrode (PX) is formed on this gate metal layer (GTM). The gate electrode (GT) formed integral with the gate line (GL) is formed on the semiconductor layer (PS) through the inter-layer insulator (PAS3) that constitutes the gate insulating film.

On the inter-layer insulators (PAS2, PAS3), the metal wiring layer (MW) that acts as one electrode of the decoupling capacitor (Csp) is formed. This metal wiring layer (MW) and the gate metal layer (GTM) (or the pixel electrode (PX)) are opposed to each other through the inter-layer insulator (PAS1), and constitute the decoupling capacitor (Csp).

The metal wiring layer (MW) that acts as one electrode of the decoupling capacitor (Csp) is connected to the metal wiring layer (CML). This wiring layer (CML) is connected to the receiving circuit (S-CIR) in the liquid crystal display panel. By this configuration, it is possible to transmit the signal transmitted through the coupling capacitor (Ccm) to the receiving circuit (S-CIR) in the liquid crystal display panel.

Incidentally, the decoupling capacitor (Cps) may be constructed using other wiring layers than the metal wiring layer (MW) and the gate metal layer (GTM) (or the pixel electrode (PX)).

Fourth Embodiment

Figure 16A:
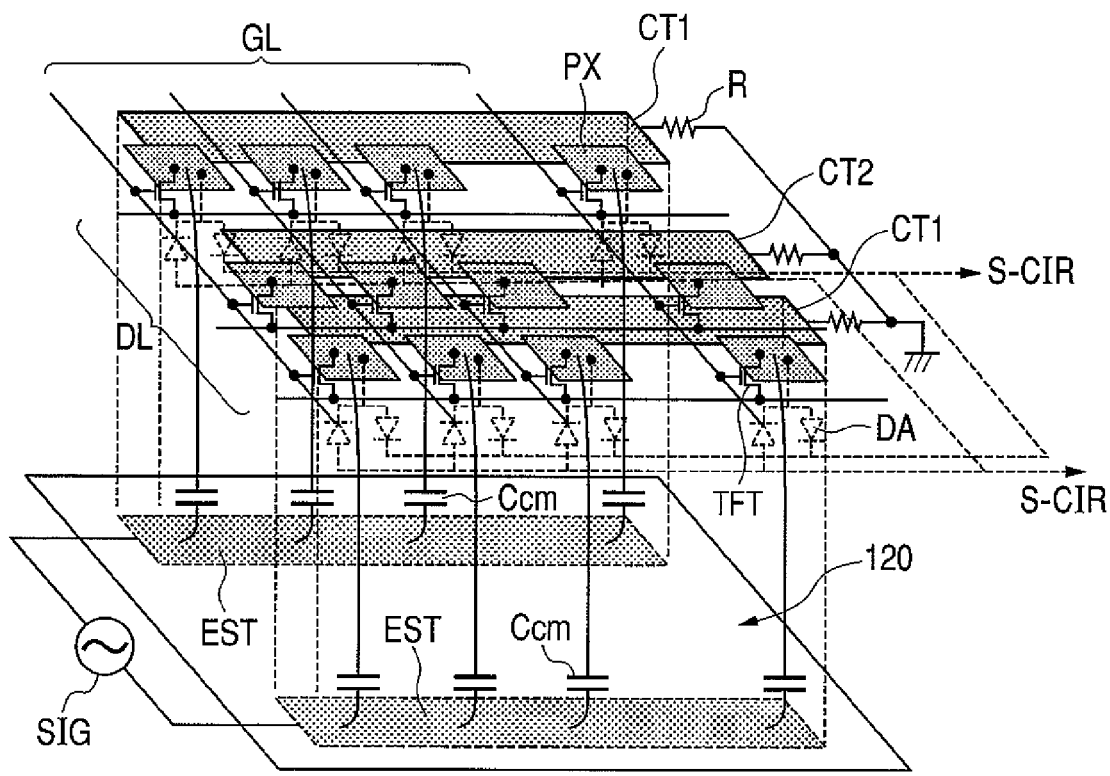
FIG. 16A and FIG. 16B are diagrams showing an outline configuration of a liquid crystal display panel of a fourth embodiment of the present invention.
Figure 16B:
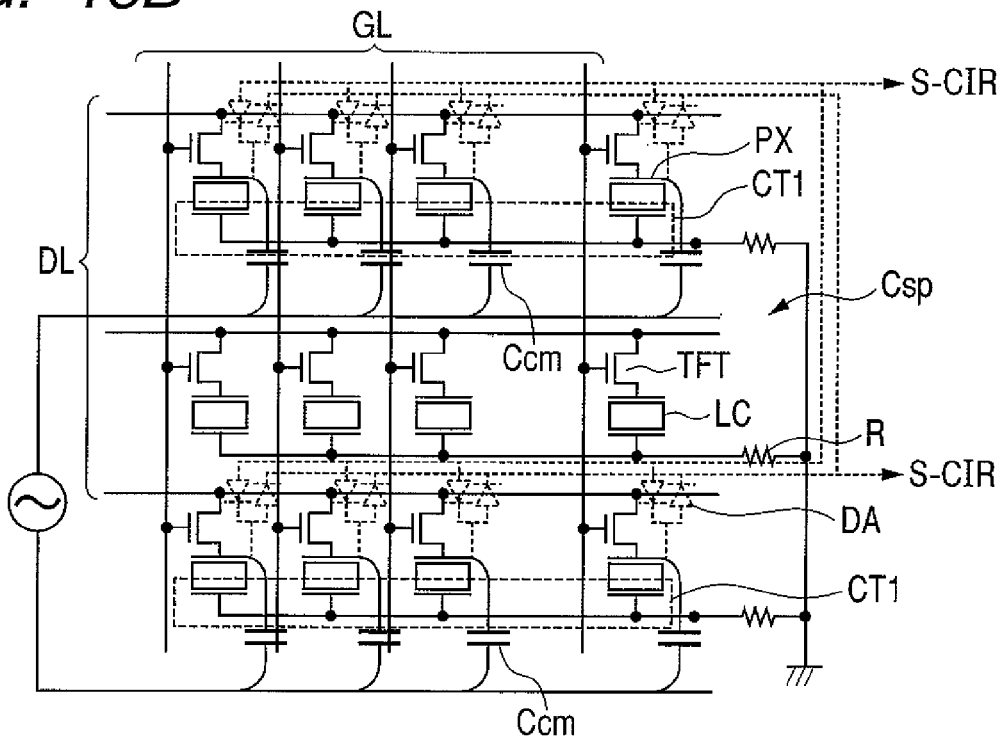

FIGS. 16A and 16B are diagrams showing an outline configuration of the liquid crystal display panel of a fourth embodiment of the present invention, wherein FIG. 16A is a diagram showing the arrangement relation of the transmitting and receiving electrodes, and FIG. 16B is a circuit diagram showing an equivalent circuit.

Also in this embodiment, the pixel electrodes (PX's) of the pixels that are opposed to the transmitting electrodes (EST's) function as the group of receiving electrodes. In this embodiment, the case where the transmitted signal from the one signal source (SIG) is transmitted by the two pairs of groups of transmitting and receiving electrodes is assumed.

The signals to be transmitted from the respective pixel electrodes (PX's) that constitute the group of receiving electrodes are brought into one through diodes (DA's), and this one signal is inputted into the receiving circuit (S-CIR) in the liquid crystal display panel. In this embodiment, since the pixel electrodes are electrically separated by the diodes (DA's), the pixel electrodes will not interfere with one another.

Figure 17:
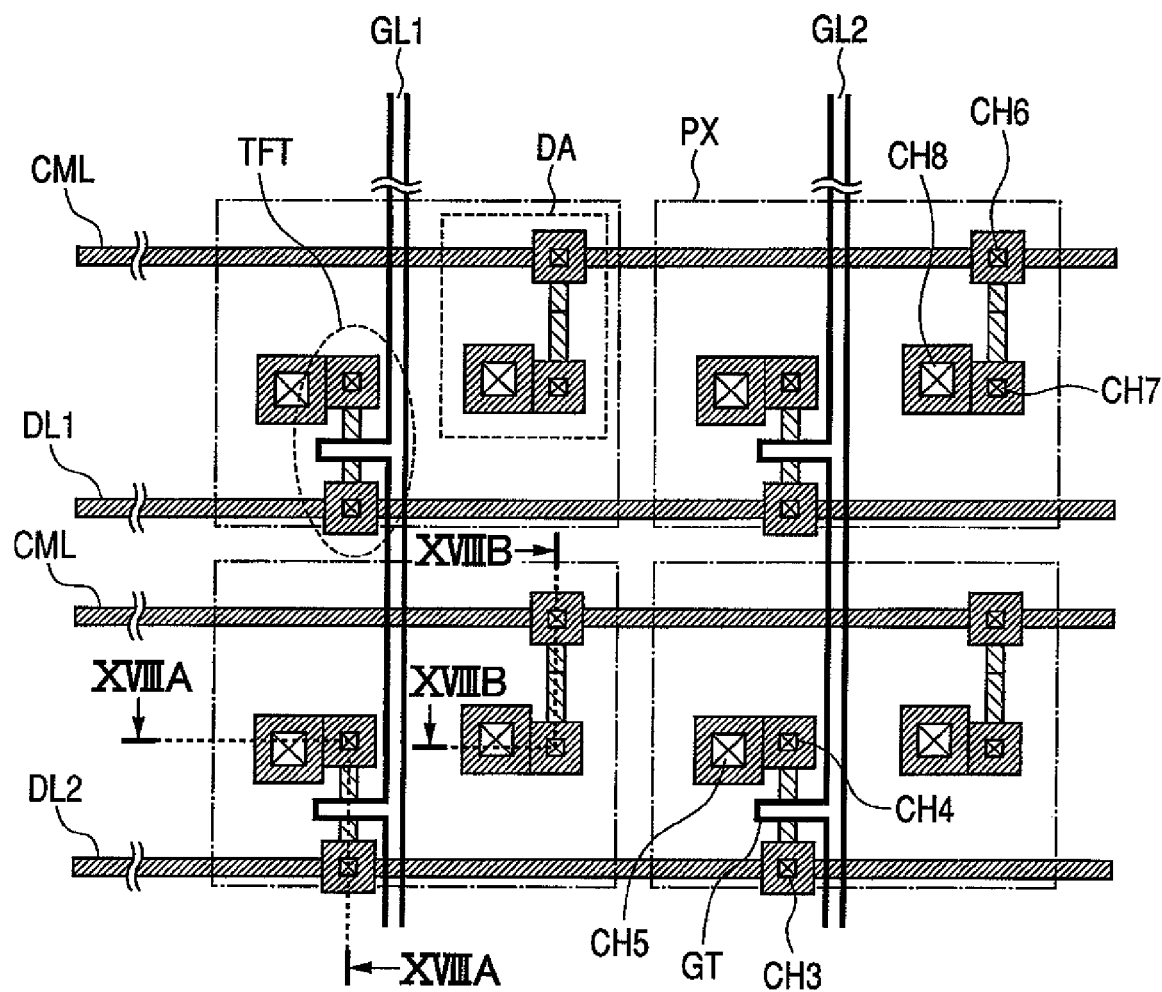
FIG. 17 is a diagram showing an example layout of the each pixel in the case where the pixel electrode is used as the receiving electrode in the fourth embodiment of the present invention.

FIG. 17 shows a layout example of the each pixel in the case where the pixel electrode (PX) is used as the receiving electrode. In FIG. 17, the layout of the pixel electrode (PX), the thin film transistor (TFT), and the one diode (DA) are shown.

Since the reflective liquid crystal display panel is assumed in this embodiment, the pixel electrode (PX) is made up of a material that does not transmit the light, but reflects it. Considering this, the thin film transistor (TFT) and the one diode (DA) are integrated under the pixel electrode (PX).

In this embodiment, a diode that had the same structure as that of the thin film transistor (TFT) and whose P-N junction plane was formed in a direction perpendicular to the FET channel was used as the diode (DA). A feature of this diode is that a junction capacitance can be reduced to ⅒ or less of that of a TFT diode that uses the gate electrode of the thin film transistor (TFT). By this fact, generation of the stray capacitance can be minimized.

Figure 18A:
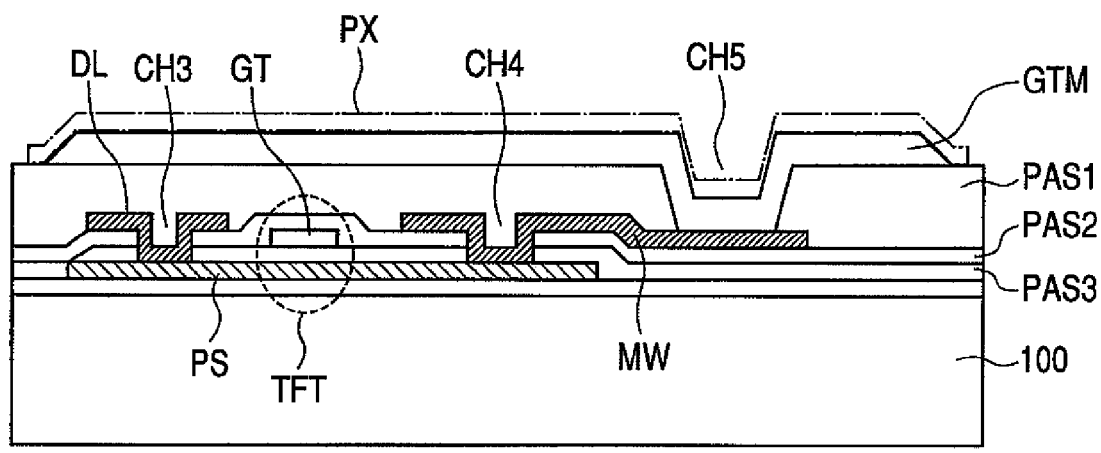
FIG. 18A and FIG. 18B are sectional views showing cross-sectional structures along the cutting line XVIIIA-XVIIIA of FIG. 17 and along the XVIIIB-XVIIIB cutting plane line of FIG. 17, respectively.
Figure 18B:
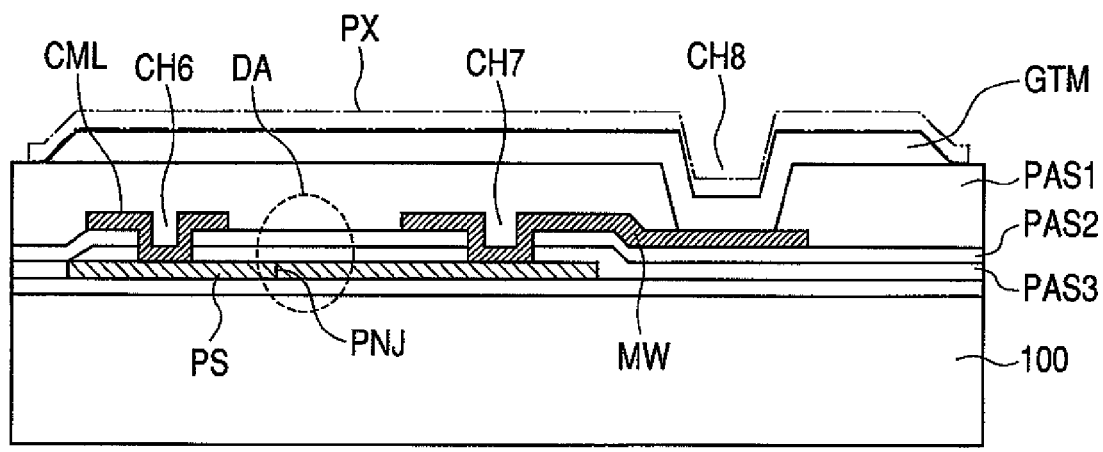
Figure 19:
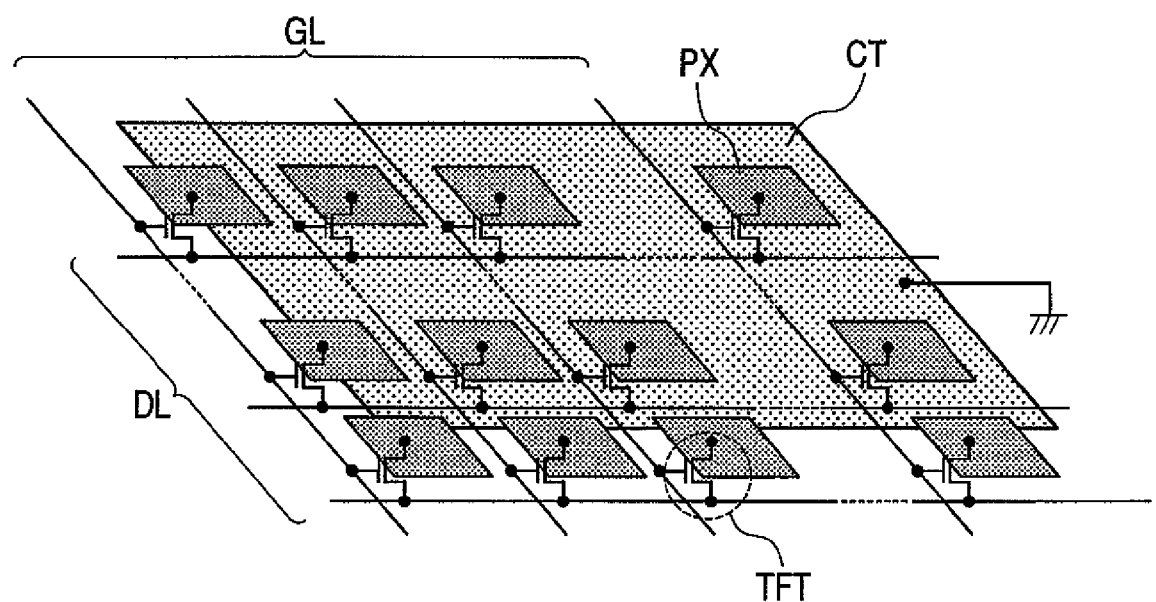
FIG. 19 is a diagram showing a configuration of a pixel of an active matrix liquid crystal display panel.

FIGS. 18A and 18B are sectional views showing cross-sectional structures along the cutting line XVIIIA-XVIIIA of FIG. 17 and along the XVIIIB-XVIIIB cutting plane line of FIG. 17.

FIG. 18A is a sectional view showing a cross-sectional structure along the cutting line XVIIIA-XVIIIA of FIG. 17, which illustrates the thin film transistors (TFT's) are integrated under the pixel electrode (PX) in the cutting line XVIIIA-XVIIIA. FIG. 18B is a sectional view showing a cross-sectional structure along the cutting line XVIIIB-XVIIIB of FIG. 17, which illustrates the one diode (DA) is integrated in the cutting line XVIIIB-XVIIIB.

Since the cross-sectional structure along the cutting line XVIIIA-XVIIIA of FIG. 17 is the same as the cross-sectional structure along the cutting line XVA-XVA of FIG. 14 shown in FIG. 15A, its repeated explanation is omitted.

As shown in FIG. 18A, the metal wiring layer (CML) formed on the panel board 100 is connected to one electrode of the diode (DA) through a contact hole (CH6) formed in the inter-layer insulators (PAS2, PAS3).

The thin film transistor (TFT) and the diode (DA) are analogous in cross-sectional structure, and a junction plane (PNJ of FIG. 18B) of the diode (DA) is formed perpendicularly to a FET channel and a board plane. A formation process of the thin film transistor (TFT) can be diverted to this diode.

The other electrode of the diode (DA) is connected to the metal wiring layer (CML) through a contact hole (CH7) formed in the inter-layer insulators (PAS2, PAS3), and the metal wiring layer (MW) is connected to the gate metal layer (GTM) through a contact hole (CH8) formed in the inter-layer insulator (PAS1). A pixel electrode (PX) is formed on this gate metal layer (GTM).

The metal wiring layer (CML) is connected to the receiving circuit (S-CIR) in the liquid crystal display panel. This makes it possible for the signal transmitted through the coupling capacitor (Ccm) to be transmitted to the receiving circuit (S-CIR) in the liquid crystal display panel.

Since as explained above, according to these embodiments, the pixel electrode or the counter electrode of the each pixel is configured to be used as a receiving electrode for capacitive coupling, it is possible to arrange the electrode for capacitive coupling in the each pixel. For this reason, it becomes possible to reduce the frame area of the liquid crystal display panel.

Incidentally, although in the above-mentioned explanation, a case of the reflective liquid crystal display panel was described, the present invention is also applicable to a transmissive liquid crystal display panel. However, in the case of the transmissive liquid crystal display panel, a back light is disposed on the back side of the liquid crystal display panel. Then, since the transmitting board 120 is disposed between the back light and the liquid crystal display panel, the transmitting board 120 must be constructed with a transparent board (e.g., a glass board, a plastic board, etc.), and similarly the transmitting electrode (EST) must be made up of a transparent conducting film, such as ITO.

Furthermore, the pixel electrode (PX) of the each pixel must be made up of the transparent conducting film. In addition to this, in order to improve an aperture ratio, for example, an electrode of the decoupling capacitor (Csp) to be formed in the each pixel must be made up of the transparent conducting film.

Still moreover, although in the above-mentioned explanation, the case where the present invention was applied to the liquid crystal display panel of the vertical electric field system was described, the present invention is applicable to any panel having one planar electrode. For example, among the liquid crystal display panels (also called the liquid crystal display panel of an IPS system) of a lateral electric field system, one such that a pixel electrode having a slit part is arranged on one planar counter electrode through an insulator is known. The present invention is also applicable to the liquid crystal display panel like this.

Further, an active matrix organic EL display panel of a top emission system has one planar cathode electrode. The present invention is also applicable to the organic EL display panel like this.

In the foregoing, the invention made by the present inventors was explained concretely based on the embodiments. It is natural that the present invention is not limited by the embodiments, but can be modified variously as long as the modification does not deviate from its gist.

What is claimed is:

1. An image display device comprising:
a display panel having a plurality of pixels; and
a second board having a transmitting electrode,
the display panel having a first board disposed in such a way that it superimposes on the second board,
the each pixel having a pixel electrode and a counter electrode, and
the counter electrode being formed in a tabular shape and being opposed commonly to the pixel electrodes of the pixels,
wherein the counter electrode is divided into a portion A corresponding to the transmitting electrode on the second board and a portion B other than it, and
wherein the portion A and the portion B of the counter electrode are connected to a common voltage through resistors, respectively.

2. The image display device according to claim 1,
wherein the transmitting electrode of the second board includes a pair of transmitting electrodes for electric power, a plurality of transmitting electrodes for signals, and a transmitting electrode for reference voltage arranged between the one pair of transmitting electrodes for electric power and the plurality of transmitting electrodes for signals.

3. The image display device according to claim 1,
wherein the portion B of the counter electrode is divided into a plurality of areas along an equipotential line that is produced in a case where a certain electric charge is given in the portion A, and
wherein each of the plurality of areas is connected to the common voltage through a resistor.

4. The image display device according to claim 1,
wherein the display panel has a third board being opposed to the first board,
wherein the portion A and the portion B of the counter electrode are formed on the third board,
wherein the first board has a first connection part,
wherein the resistor is formed on the first board and is connected to the first connection part,
wherein the third board has a second connection part that is connected to edges of the portion A and the portion B of the counter electrode, and has conductive beads that are disposed between the first connection part and the second connection part and electrically connects the second connection part and the first connection part, and
wherein the common voltage is supplied to the portion A and the portion B of the counter electrode through the resistor, the first connection part, and the second connection part.

5. The image display device according to claim 4,
wherein the second connection parts are disposed at one of edges of the portion A and the portion B or at the other of the edges thereof alternately.

6. The image display device according to claim 1,
wherein the portion A of the counter electrode constitutes a receiving electrode, and wherein the portion A of the counter electrode is connected to a receiving circuit in the display panel through a decoupling capacitor.

7. The image display device according to claim 6,
wherein the display panel is a liquid crystal display panel that has a liquid crystal sandwiched between the first board and a third board being opposed to the first board,
wherein the counter electrode is formed on the third board.

8. The image display device according to claim 6,
wherein the display panel is a liquid crystal display panel that has a liquid crystal sandwiched between the first board and a third board being opposed to the first board, and
wherein the counter electrode is formed on the first board.

9. The image display device according to claim 6,
wherein the display panel is an organic EL (Electroluminescence) display panel.

10. The image display device according to claim 1,
wherein a group of pixel electrodes of the pixels that are opposed to the transmitting electrodes of the second board constitute the receiving electrode, and
wherein the group of pixel electrodes are connected to a receiving circuit in the display panel through decoupling capacitors, respectively.

11. The image display device according to claim 10,
wherein one of electrodes of the decoupling capacitor is the electrode of the each pixel, and
wherein the other of the electrodes of the decoupling capacitor is an electric conductive layer that is opposed to the each pixel electrode through an inter-layer insulator.

12. The image display device according to claim 10,
wherein the display panel is a liquid crystal display panel that has a liquid crystal sandwiched between the first board and a third board being opposed to the first board, and
wherein the counter electrode is formed on the third board.

13. The image display device according to claim 10,
wherein the display panel is a liquid crystal display panel that has a liquid crystal sandwiched between the first board and a third board being opposed to the first board, and
wherein the counter electrode is formed on the first board.

14. The image display device according to claim 10,
wherein the display panel is an organic EL display panel.

15. The image display device according to claim 1,
wherein the group of the pixel electrodes of the pixels being opposed to the transmitting electrodes of the second board constitute the receiving electrode, and
wherein the group of the pixel electrodes are connected to a receiving circuit in the display panel through diodes, respectively.

16. The image display device according to claim 15,
wherein the diode is a diode that is formed in a lower layer of the pixel electrode of the each pixel whose P-N junction plane lies in a direction perpendicular to a semiconductor layer.

17. The image display device according to claim 15,
wherein the display panel is a liquid crystal display panel that has a liquid crystal sandwiched between the first board and a third board being opposed to the first board, and
wherein the counter electrode is formed on the third board.

18. The image display device according to claim 15,
wherein the display panel is a liquid crystal display panel that has a liquid crystal sandwiched between the first board and a third board being opposed to the first board, and
wherein the counter electrode is formed on the first board.

19. The image display device according to claim 15,
wherein the display panel is an organic EL display panel.

* * * * *